United States Patent Office 3,082,209
Patented Mar. 19, 1963

3,082,209
4-METATHIAZANONE DERIVATIVES AND
THEIR PREPARATION
Alexander R. Surrey, Albany, N.Y., assignor to Sterling Drug Inc., New York, N.Y., a corporation of Delaware
No Drawing. Filed Nov. 28, 1958, Ser. No. 776,736
30 Claims. (Cl. 260—243)

This invention relates to 2-(lower-aromatic)-4-metathiazanones and is more particularly concerned with certain derivatives thereof and a method for the preparation of such derivatives.

Among the compounds of my invention are those represented by the general Formula I

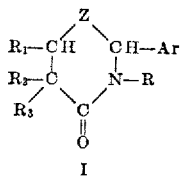

I where Z represents S, SO or $SO_2$; Ar represents a lower-aromatic radical; R represents hydrogen, a lower-aliphatic-hydrocarbon radical having an aliphatic carbon atom linked to the ring-nitrogen atom, a lower-cycloalkyl radical, a lower-cycloalkylalkyl radical or a (lower-monocyclic-aromatic)-(lower-alkyl) radical; and $R_1$, $R_2$ and $R_3$ each represent hydrogen or a lower-alkyl radical. Thus, this aspect of my invention is a composition of matter selected from the group consisting of 2-(lower-aromatic)-3-(lower-hydrocarbon or lower-aromatic-alkyl)-4-metathiazanones and 2-(lower-aromatic)-4-metathiazanones having up to three lower-alkyl radicals substituted in the 5- and 6-metathiazanone ring positions, and, -1-oxides and -1-dioxides thereof.

The physical embodiments of my invention have been tested by standard pharmacological evaluation procedures and found to possess activity as central nervous system depressants, in particular, internuncial blocking, anticonvulsant, antipyretic, and barbiturate-potentiating activities. In addition, these compounds have the advantageous property of having relatively low toxicity. The compounds where Z is S have further utility as intermediates for the preparation of my compounds where Z is SO or $SO_2$. Also, the compounds where Z is SO can be used as intermediates for the preparation of the compounds where Z is $SO_2$.

The term "lower-aromatic," as used herein, means aromatic radicals having one or two aromatic rings each having from five to six ring-atoms which are carbocyclic or heterocyclic, as illustrated by phenyl, naphthyl, biphenylyl, furyl, pyridyl, pyrimidyl, thiazolyl, oxazolyl, triazinyl, pyrrryl and thienyl radicals. Preferred embodiments of my invention are compounds of the above Formula I where the lower-aromatic radical designated as Ar is a monocarbocyclic-aryl radical having six ring-carbon atoms, that is, an aryl radical of the benzene series. These embodiments, which are preferred primarily because of their commercial practicability due to availability of intermediates, include compounds where Ar represents the unsubstituted phenyl radical and phenyl radicals substituted by low-molecular weight substituents such as lower-alkyl, lower-alkoxy, lower-alkylmercapto, lower-alkylsulfonyl, halo, trifluoromethyl, nitro, amino, lower-alkylamino, lower-carboxylic-acylamino, phenoxy, benzyloxy, hydroxy, phenylmercapto, benzyl, 4-chlorophenoxy, and the like. The substituted phenyl radicals have preferably from one to three substituents which can be in any of the available positions of the phenyl nucleus, and where more than one substituent is present, they can be the same or different and they can be in any of the various position combinations relative to each other. The halo substituents include chloro, bromo, iodo and fluoro. The lower-alkyl, lower-alkoxy, lower-alkylmercapto, lower-alkylsulfonyl, lower-alkylamino, lower-carboxylic-acylamino, and the like substituents have preferably from one to six carbon atoms which can be arranged as straight or branched chains, and are illustrated by methyl, ethyl, n-propyl, isobutyl, n-hexyl, methoxy, isobutoxy, ethylmercapto, n-amylmercapto, isopropylsulfonyl, n-butylsulfonyl, ethylamino, n-butylamino, acetylamino, propionylamino, and the like.

The other lower-aromatic radicals, e.g., naphthyl, biphenylyl, furyl, pyridyl and thienyl radicals, can be unsubstituted or substituted by substituents such as those illustrated above as substituents of the phenyl radical.

$R_1$, $R_2$ and $R_3$ when representing lower-alkyl can be the same or different and the term "lower-alkyl," as used herein, means alkyl radicals having from one to three carbon atoms, including such examples as methyl, ethyl, n-propyl and isopropyl. Preferred embodiments are the compounds of Formula I (above) where $R_1$, $R_2$ and $R_3$ each represent hydrogen, these embodiments being preferred because of their commercial practicability due to availability and low cost of intermediates.

The term "lower-aliphatic-hydrocarbon," as used herein, means aliphatic-hydrocarbon radicals having an aliphatic carbon atom linked to the ring-nitrogen atom and having from one to eight carbon atoms, and comprehends alkyl, alkenyl and alkynyl radicals, as illustrated by methyl, ethyl, n-propyl, isopropyl, 2-butyl, isoamyl, n-hexyl, n-octyl, and the like, when alkyl; 2-propenyl (allyl), 3-butenyl, 2-hexenyl, and the like, when alkenyl; and, 2-propynyl (propargyl), 3-butynyl, 2-hexynyl, and the like, when alkynyl.

The term "lower-cycloalkyl" as used herein, means cycloalkyl radical having from three to six ring-carbon atoms and having up to a total of about eight carbon atoms, as illustrated by cyclopropyl, cyclopentyl, cyclohexyl, 2-methylcyclohexyl, 4-ethylcyclohexyl, and the like.

The term "lower-cycloalkylalkyl," as used herein, means cycloalkylalkyl radicals having from three to six ring-carbon atoms and having up to a total of about eight carbon atoms, as illustrated by cyclopropylmethyl, cyclopropylethyl, cyclopentylmethyl, cyclopentylpropyl, cyclohexylmethyl, cyclohexylethyl, and the like.

The term "(lower - monocyclic - aromatic) - (lower-alkyl)," as used herein, means aromatic-alkyl radicals where the "alkyl" portion has from one to two carbon atoms and the "aromatic" portion is an aromatic radical having from five to six ring-atoms which is carbocyclic or heterocyclic, as illustrated, inter alia, above for "Ar," e.g., phenyl, furyl, pyridyl, thienyl, halophenyl, alkoxyphenyl, and the like. Illustrations of (lower-monocyclic-aromatic)-(lower-alkyl) radicals are benzyl, phenethyl, 2-furylmethyl, 2-(3-pyridyl)ethyl, 4-chlorobenzyl, 2-(3,4-dimethoxyphenyl)ethyl, 5-acetylaminopyridylmethyl, and the like.

The compounds of my invention where Z is S are prepared preferably by heating a beta-mercaptopropionic acid, $HS-CH(R_1)C(R_2)(R_3)COOH$, with a lower-aromatic aldehyde, ArCHO in the presence of ammonia (e.g., from ammonium carbonate) to form the compounds where R is H or in the presence of a primary amine, $R-NH_2$, to form the compounds where R is other than H as defined above. $R_1$, $R_2$, $R_3$ and Ar also have the meanings designated hereinabove. The reaction is carried out using a temperature range of about 65° C. to about 110° C. The reaction probably takes place in three steps which may be illustrated diagrammatically as follows:

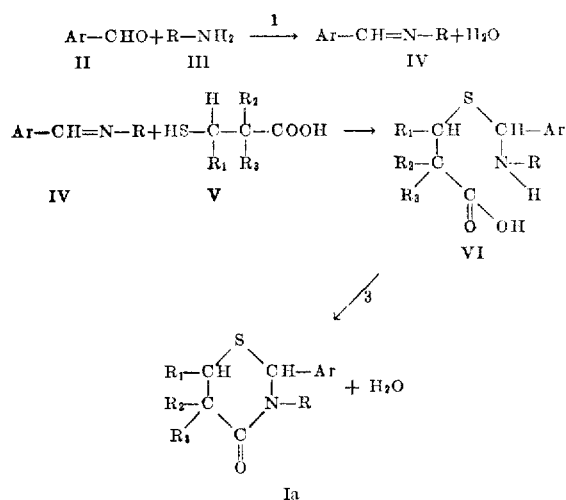

Thus, in the first step (1) the lower-aromatic aldehyde (II) is condensed with ammonia (III where R is H; derived from an aminating agent as defined below) or a primary amine (III where R is other than H as defined above) to yield an imine (IV where R is H) or an N-substituted-imine (IV where R is other than H), respectively, plus water. In the second step (2) the beta-mercaptopropionic acid (V) adds to the carbon-nitrogen double bond of the azomethine compound (IV) to yield the aminomethylmercaptopropionic acid derivative (VI) which cyclizes in the third step (3) to yield the desired 2-(lower-aromatic)-4-metathiazanone (Ia) plus a second molecule of water. The process is carried out without isolating the intermediate azomethine compound (IV) or the aminomethylmercaptopropionic acid derivative (VI). Since two molar equivalents of water (one in each of steps 1 and 3) are formed for every mole of metathiazanone (Ia) produced, the extent of condensation (in step 1) and cyclization (in step 3) can be followed and the reaction time ascertained by carrying out the procedure in an inert, non-polar solvent such as benzene and collecting the water in a continuous separator connected to the apparatus. The procedure is carried out preferably in refluxing benzene until no more water is collected. Illustrative of the process of my invention is the preparation of: 2-(4-chlorophenyl)-3-methyl-4-metathiazanone using 4-chlorobenzaldehyde, methylamine and beta-mercaptopropionic acid as the reactants; and 2-(3,4-dichlorophenyl)-5-ethyl-6-methyl-4-metathiazanone using 3,4-dichlorobenzaldehyde, ammonium carbonate and alpha-ethyl-beta-methyl-beta-mercaptopropionic acid.

The above procedure, while being the preferred method of preparing my 2-(lower-aromatic)-4-metathiazanones, can be modified, but usually with diminished yields. For example, the preparation can be run at lower temperatures down to about room temperature but the reaction time required is longer; or it can be carried out without a solvent or using other solvents such as toluene, ethanol, isopropanol, n-hexane, and the like.

The preparation of my 2-(lower-aromatic)-4-metathiazanones of Formula I where Z is S and R is H is carried out according to the procedure described and illustrated above using an aminating agent, or a source of ammonia, i.e., a compound having a high ammonia partial pressure which usually loses ammonia on standing and which decomposes readily when heated to lose ammonia. Such aminating agents are generally ammonium salts of a weak acid, i.e., one having an ionization constant of about $10^{-6}$ or weaker. Thus, aminating agents suitable in my process include ammonium carbonate, ammonium bicarbonate, ammonium carbamate, and the like.

In carrying out my invention, I preferred to use as the aminating agent commercial ammonium carbonate which actually is a mixture of ammonium bicarbonate and ammonium carbamate (see page 62 of the sixth edition of "The Merck Index," Merck & Co., Inc., Rahway, N.J., 1952 or page 810 of the fourth edition of Ephraim's "Inorganic Chemistry," Nordeman Publishing Co., Inc., New York, N.Y., 1943). Thus, when hereinafter used, ammonium carbonate will mean commercial ammonium carbonate. Another alternative procedure is to use ammonium beta-mercaptopropionate in place of the aminating agent and beta-mercaptopropionic acid. This ammonium salt can be obtained by adding methanolic ammonia to a solution of beta-mercaptopropionic acid until the reaction mixture is alkaline to litmus; the excess ammonia is removed in vacuo and the ammonium beta-mercaptopropionate that separates is filtered, washed with ether, air-dried and used without further purification.

The 2-(lower-aromatic)-4-metathiazanone-1-oxides (Formula I) of my invention are prepared by oxidizing the corresponding 2-(lower-aromatic)-4-metathiazanone. This oxidation is carried out by reacting the 2-(lower-aromatic)-metathiazanone with an oxidizing agent effective to oxidize sulfides to sulfoxides. Various oxidative procedures can be employed but the one preferred in practicing my invention comprises using a per-organic acid, e.g., peracetic acid, in a suitable solvent e.g., ethyl acetate. The reaction is exothermic and is carried out preferably by mixing the reactants at a low temperature, i.e., from 0 C. to 10° C.; in some cases, the temperature of the reaction mixture rose rapidly up to temperatures as high as 40° C. Other oxidizing agents that can be used are other per-organic acids, e.g., perbenzoic acid.

The 2-(lower-aromatic)-4-metathiazanone-1-dioxides of my invention (Formula I where Z is $SO_2$) are prepared by oxidizing the corresponding 2-(lower-aromatic)-4-metathiazanones (Formula I where Z is S). This oxidation is carried out by reacting the 2-(lower-aromatic)-4-metathiazanone with an oxidizing agent effective to oxidize sulfides to sulfones. Various oxidative procedures can be employed, but the one preferred in practicing my invention comprises using potassium permanganate in aqueous acetic acid solution. Other oxidizing agents that can be used include hydrogen peroxide, chromium trioxide ($CrO_3$), and the like. Alternatively, the 2-(lower-aromatic)-4-metathiazanone-1-dioxides can be prepared by oxidizing the corresponding 1-oxides (Formula I where Z is SO), using these same oxidizing agents effective to oxidize sulfides to sulfones, e.g., potassium permanganate, hydrogen peroxides, etc.

The chemical structures of my 2-(lower-aromatic)-4-metathiazanones and corresponding-1-oxides and-1-dimetathiazanones and corresponding-1-oxides and -1-dioxides are established by the mode of their syntheses and corroborated by the correspondence of calculated and found values for the elementary analyses for representative examples.

This application is a continuation-in-part of my copending applications Serial Numbers 599,011, filed July 20, 1956 and 732,818, filed May 5, 1958, both now abandoned. The compounds of Formula I where Z is S or $SO_2$ are disclosed and claimed in S.N. 599,011 and the compounds of Formula I where Z is SO are disclosed and claimed in S.N. 732,818.

The following examples will further illustrate specific embodiments of the invention without, however, limiting it thereto.

*Example 1*

2 - (lower-aromatic) - 3 - hydrocarbyl - 4 - metathiazanones.—The preparation of these compounds is illustrated by the following preparation of 2-(3,4-dichlorophenyl)-3-methyl-4-metathiazanone: A solution of 43.8 g. of 3,4-dichlorobenzaldehyde, 26.5 g. of beta-mercaptopropionic acid and 7.5 g. of methylamine in 250 cc. of benzene was refluxed with a continuous separator connected to the reaction vessel for removal of water formed by the reaction. After two hours 8 cc. of water had been collected (theory 9 cc.). The reaction mixture was cooled, washed with dilute ammonium hydroxide and water, and the benzene was removed by distillation in vacuo. The oily residue was taken up in ether from which it crystallized. The precipitate was recrystallized twice from ether to yield 27 g. of product, 2-(3,4-dichlorophenyl)-3-methyl-4-metathiazanone, M.P. 78.2–79.9° C. (corr.).

Analysis.—Calcd. for $C_{11}H_{11}Cl_2NOS$: S, 11.61; Cl, 25.67. Found: S, 11.99; Cl, 25.50.

2-(3,4-dichlorophenyl)-3-methyl-4-metathiazanone suspended in an aqueous 1% gum tragacanth solution was found to increase the hexobarbital sodium-induced sleeping time in mice by about 51%, 108%, 206% and 350% when administered intraperitoneally (30 minutes before the intravenous administration of 60 mg. per kg. of hexobarbital sodium) at dose levels of 12.5, 25, 50 and 100 mg. per kg., respectively. These results indicate that this compound has central nervous system depressant activity and is useful as a potentiator for barbiturates. Also, this compound when administered intraperitoneally as a suspension in an aqueous 1% gum tragacanth solution at dose levels of 100 mg. per kg. and 400 mg. per kg. prevented death of 4 out of 10 and 9 out of 10 mice, respectively, which were treated with fatal doses ($LD_{100}$) of strychnine hydrochloride given intravenously 60 minutes after administration of the metathiazanone; this is an illustration of central nervous system depressant and anti-convulsant activities of this compound. 2-(3,4-dichlorophenyl)-3-methyl-4-metathiazanone was found to have an acute toxicity ($LD_{50}$) in mice of 1550±388 mg. per kg. after 24 hours and 1220±286 mg. per kg. after 7 days when administered orally as a suspension in an aqueous 1% gum tragacanth solution.

The interperitoneal dose of 2-(3,4-dichlorophenyl)-3-methyl-4-metathiazanone required to protect 5 out of 10 mice (i.p.$PD_{50}$) from the hind limb extensor component of maximal electroshock seizures was found to be 94±6.2 mg. per kg. using essentially the method described by Swinyard et al., J. Pharmacol. & Exp. Therap. 106, 319 (1952). This procedure demonstrates the anticonvulsant properties of this compound.

The oral dose of 2-(3,4-dichlorophenyl)-3-methyl-4-metathiazanone required to lower the rectal temperature in mice 5° F. ($ED_5$.) was found to be 350 mg. per kg. The compound was administered orally as a suspension in aqueous 1% gum tragacanth solution at dose levels of 50, 100, 200 and 400 mg. per kg., using 10 mice at each dose level. The rectal temperature was measured by means of a calibrated thermocouple at one, two, four and six hour intervals following administration. This procedure demonstrates central nervous system depressant activity, in particular, antipyretic activity of this compound.

Other representative 2-(lower-aromatic)-3-hydrocarbyl-4-metathiazanones that can be prepared according to the foregoing procedure described in Example 1 for the preparation of 2-(3,4-dichlorophenyl)-3-methyl-4-metathiazanone using the appropriate (lower-aromatic)-hydrocarbylamine and beta-mercaptopropionic acid are the following compounds of Examples 2–16.

Example 2

2-(2-chlorophenyl)-3-isobutyl-4-metathiazanone is obtained following the procedure described in Example 1 using 2-chlorobenzaldehyde, isobutylamine and beta-mercaptopropionic acid.

Example 3

2 - (3,4 - dibromophenyl) - 3 - n - hexyl - 5,5,6 - trimethyl-4-metathiazanone is obtained following the procedure described in Example 1 using 3,4-dibromobenzaldehyde, n-hexylamine and beta-mercapto-alpha,alpha,beta-trimethylpropionic acid.

Example 4

2-(3,4-dichlorophenyl)-3-methyl-5-ethyl-6-isopropyl-4-metathiazanone is obtained following the procedure described in Example 1 using 3,4-dichlorobenzaldehyde, methylamine and alpha-ethyl-beta-isopropyl-beta-mercaptopropionic acid.

Example 5

2 - (4 - iodophenyl) - 3 - methyl - 5 - n - propyl - 6 - ethyl-4-metathiazanone is obtained following the procedure described in Example 1 using 4-iodobenzaldehyde, methylamine and alpha-n-propyl-beta-ethyl-beta-mercaptopropionic acid.

Example 6

2-(4-fluorophenyl)-3-methyl-4-metathiazanone is obtained following the procedure described in Example 1 using 4-fluorobenzaldehyde, methylamine and beta-mercaptopropionic acid.

Example 7

2 - (2,4,6 - trichlorophenyl) - 3 - cyclohexyl - 5,5 - dimethyl-4-metathiazanone is obtained following the procedure described in Example 1 using 2,4,6-trichlorobenzaldehyde, cyclohexylamine and alpha, alpha-dimethyl-beta-mercaptopropionic acid.

Example 8

2 - (4 - n - butoxyphenyl) - 3 - cyclopropylmethyl - 4 - metathiazanone is obtained following the procedure described in Example 1 using 4-n-butoxybenzaldehyde, cyclopropylmethylamine and beta-mercaptopropionic acid.

Example 9

2 - (3,4,5 - trimethylphenyl) - 3 - allyl - 4 - metathiazanone is obtained following the procedure described in Example 1 using 3,4,5-trimethylbenzaldehyde, allylamine and beta-mercaptopropionic acid.

Example 10

2 - (3,4,5 - triethoxyphenyl) - 3 - methyl - 4 - metathiazanone is obtained following the procedure described in Example 1 using 3,4,5-triethoxybenzaldehyde, methylamine and beta-mercaptopropionic acid.

Example 11

2 - (para-tolyl) - 3,5,5,6 - tetramethyl - 4 - metathiazanone is obtained following the procedure described in Example 1 using 4-methylbenzaldehyde, methylamine and alpha, alpha, beta-trimethyl-beta-mercaptopropionic acid.

Example 12

2 - (2 - chloro - 4 - ethoxyphenyl) - 3 - methyl - 4-metathiazanone is obtained following the procedure described in Example 1 using 2-chloro-4-ethoxybenzaldehyde, methylamine and beta-mercaptopropionic acid.

Example 13

2 - (3 - ethyl - 4 - isopropylphenyl) - 3,5 - diethyl - 4-metathiazanone is obtained following the procedure described in Example 1 using 3-ethyl-4-isopropylbenzaldehyde, ethylamine and alpha-ethyl-beta-mercaptopropionic acid,

Example 14

2 - (4 - n - hexylphenyl) - 3,5 - diisopropyl - 6 - methyl-4-metathiazanone is obtained following the procedure described in Example 1 using 4-n-hexylbenzaldehyde, isopropylamine and alpha-isopropyl-beta-methyl-beta-mercaptopropionic acid.

Example 15

2 - (2 - naphthyl) - 3 - methyl - 4 - metathiazanone is obtained following the procedure described in Example 1 using 2-naphthaldehyde, methylamine and beta-mercaptopropionic acid.

Example 16

2-(1-biphenylyl)-3-methyl-4-metathiazanone is obtained following the procedure described in Example 1 using 1-biphenyl-carboxaldehyde, methylamine and beta-mercaptopropionic acid.

Example 17

*2-(lower-aromatic)-4-metathiazanones.*—The preparation of these compounds is illustrated by the following syntheses of 2-phenyl-4-metathiazanone as follows: A mixture of 10.6 g. of benzaldehyde, 10.6 g. of beta-mercaptopropionic acid, 6 g. of powdered ammonium carbonate and 100 cc. of benzene was refluxed for eight hours with a continuous separator connected to the reaction vessel for removal of water formed by the reaction. The reaction mixture was cooled and poured with stirring into 200 cc. of water containing 20 cc. of concentrated ammonium hydroxide. The solid which separated was collected by filtration, washed with water, air-dried, and then recrystallized from isopropyl alcohol to yield 6.5 g. of product, 2-phenyl-4-metathiazanone, M.P. 179.3–180.7° C. (corr.)

*Anal.*—Calcd. for $C_{10}H_{11}NOS$: S, 16.58: N, 7.25. Found: S, 16.34: N, 7.18.

The above reaction also can be carried out using in place of powdered ammonium carbonate other aminating agents such as ammonium carbamate, etc. Alternatively, the reaction can be run using ammonium beta-mercaptopropionate in place of ammonium carbonate and beta-mercaptopropionic acid.

2-phenyl-4-metathiazanone suspended in an aqueous 1% gum tragacanth solution was found to increase the hexobarbital sodium-induced sleeping time in mice by about 26% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death of 5 out of 8 mice which were treated with fatal doses of strychnine hydrochloride given intravenously 60 minutes after administration of the metathiazanone. 2-phenyl-4-metathiazanone was found to have an acute intraperitoneal toxicity ($ALD_{50}$) in mice of about 1500 mg. per kg. when administered as a suspension in an aqueous 1% gum tragacanth solution.

Other 2-(lower-aromatic)-4-metathiazanones that can be prepared according to the foregoing procedure described in Example 17 for the preparation of 2-phenyl-4-metathiazanone using the appropriate (lower-aromatic)-aldehyde and beta-mercaptopropionic acid are the following compounds of Examples 18–31.

Example 18

2-(3-chlorophenyl)-5-methyl-4-metathiazanone is obtained following the procedure described in Example 17 using 3-chlorobenzaldehyde and alpha-methyl-beta-mercaptopropionic acid.

Example 19

2-(3,4-dibromophenyl)-6-methyl-4-metathiazanone is obtained following the procedure described in Example 17 using 3,4-dibromobenzaldehyde and beta-methyl-beta-mercaptopropionic acid.

Example 20

2 - (3,4 - dichlorophenyl) - 5 - ethyl - 6 - n - propyl - 4 - metathiazanone is obtained following the procedure described in Example 17 using 3,4-dichlorobenzaldehyde and alpha - ethyl - beta - n-propyl-beta-mercaptopropionic acid.

Example 21

2-(4-iodophenyl)-4-metathiazanone is obtained following the procedure described in Example 17 using 4-iodobenzaldehyde and beta-mercaptopropionic acid.

Example 22

2-(4-fluorophenyl)-4-metathiazanone is obtained following the procedure described in Example 17 using 4-fluorobenzaldehyde and beta-mercaptopropionic acid.

Example 23

2 - (2,4,6 - trichlorophenyl) - 5,6 - dimethyl - 4 - metathiazanone is obtained following the procedure described in example 17 using 2,4,6-trichlorobenzaldehyde and alpha, beta-dimethyl-beta-mercaptopropionic acid.

Example 24

2 - (4 - isobutoxyphenyl) - 5,5,6 - trimethyl - 4 - metathiazanone is obtained following the procedure described in Example 17 using 4-isobutoxybenzaldehyde and alpha, alpha,beta-trimethyl-beta-mercaptopropionic acid.

Example 25

2 - (3,4,5 - trimethylphenyl) - 5,5,6 - trimethyl - 4 - metathiazanone is obtained following the procedure described in Example 17 using 3,4,5-trimethylbenzaldehyde and alpha,alpha,beta - trimethyl - beta-mercaptopropionic acid.

Example 26

2-(4-ethylphenyl)-5,5-diethyl-4-metathiazanone is obtained following the procedure described in Example 17 using 4-ethylbenzaldehyde and alpha, alpha-diethyl-beta-mercaptopropionic acid.

Example 27

2-(3-ethyl-4-isopropoxyphenyl)-5-isopropyl - 4 - metathiazanone is obtained following the procedure described ni Example 17 using 3-ethyl-4-isopropoxybenzaldehyde and alpha-isopropyl-beta-mercaptopropionic acid.

Example 28

2-(3-ethoxy-4-chlorophenyl)-4-metathiazanone is obtained following the procedure described in Example 17 using 3-ethoxy-4-chlorobenzaldehyde and beta-mercaptopropionic acid.

Example 29

2-(3-n-hexylphenyl)-5-methyl-4-metathiazanone is obtained following the procedure described in Example 17 using 3-n-hexylbenzaldehyde and alpha-methyl-beta-mercaptopropionic acid.

Example 30

2-(1-naphthyl)-4-metathiazanone is obtained following the procedure described in Example 17 using 1-naphthaldehyde and beta-mercaptopropionic acid.

Example 31

2-(2-biphenylyl)-4-metathiazanone is obtained following the procedure described in Example 17 using 2-biphenylcarboxaldehyde and beat-mercaptopropionic acid.

Example 32

2-(2,4-dichlorophenyl)-3-methyl-4 - metathiazanone.— This compound was prepared following the procedure given above in Example 1 using 35 g. of 2,4-dichlorobenzaldehyde, 21.2 g. of beta-mercaptopropionic acid, 6.2 g. of methylamine, 200 cc. of benzene and a reflux period of forty-eight hours. There was thus obtained 35 g. of product, 2-(2,4-dichlorophenyl)-3-methyl - 4 - metathiazanone, M.P. 117.8–122.3° C. (corr.) when recrystallized from ether.

*Analysis.*—Calcd. for $C_{11}H_{11}Cl_2NOS$: S, 11.61; Cl, 25.67. Found: S, 11.36; Cl, 25.50.

2-(2,4-dichlorophenyl)-3-methyl-4-metathiazanone suspended in an aqueous 1% gum tragacanth solution was found to increase the hexobarbital sodium-induced sleeping time in mice by about 215% when administered orally (30 minutes before the intraperitoneal administration of 100 mg. per kg. of hexobarbital sodium) at a dose level of 100 mg. per kg. Also, this compound when administered intraperitoneally as a suspension in an aqueous 1% gum tragacanth solution at dose levels of 100 mg.

per kg. and 400 mg. per kg. prevented death in 1 out of 10 and 3 out of 7 mice, respectively, which were treated with fatal doses of strychnine hydrochloride given intravenously 60 minutes after administration of the metathiazanone. 2-(2,4-dichlorophenyl)-3-methyl-4-metathiazanone was found to have and acute oral toxicity (ALD$_{50}$) in mice of about 2500 mg. per kg.

2-(2,4-dichlorophenyl)-3-methyl-4-metathiazanone when administered orally as a suspension in an aqueous 1% gum tragacanth solution was found to lower the rectal temperature in mice 3.7° F. at 400 mg. per kg., using 10 mice at the dose level. The rectal temperature was measured by means of a calibrated thermocouple at one, two, four and six hour intervals following administration.

*Example 33*

2-(4-isopropylphenyl)-3-methyl-4 - metathiazanone.— This compound was prepared following the procedure described in Example 1 using 74.1 g. of 4-isopropylbenzaldehyde, 53 g. of beta-mercaptopropionic acid, 15 g. methylamine, 500 cc. of benzene and a reflux period of sixteen hours. There was thus obtained 35 g. of product, 2-(4-isopropylphenyl)-3-methyl-4-metathiazanone, M.P. 110.0–112.1° C. (corr.) when recrystallized from ether.

*Analysis.*—Calcd. for C$_{14}$H$_{19}$NOS: S, 12.86; C, 67.44; H, 7.68. Found: S, 12.72; C, 67.41; H, 7.74.

2-(4-isopropylphenyl)-3-methyl-4-metathiazanone suspended in an aqueous 1% gum tragacanth solution was found to increase the hexobarbital sodium-induced sleeping time in mice by about 154% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death in 6 out of 10 mice which were treated with fatal doses of strychnine hydrochloride given intravenously 30 minutes after administration of the metathiazanone. 2-(4-isopropylphenyl)-3-methyl-4-metathiazanone was found to have an acute oral toxicity (ALD$_{50}$) in mice of about 9000 mg. per kg.

The intraperitoneal dose of 2-(4-isopropylphenyl)-3-methyl-4-metathiazanone required to protect 5 out of 10 mice (i.p.PD$_{50}$) from the hind limb extensor component of maximal electroshock seizures was found to be 200±32 mg. per kg. using essentially the method described by Swinyard et al., ibid.

*Example 34*

2-(4-chlorophenyl)-3-ethyl - 4 - metathiazanone.—This compound was prepared following the procedure described in Example 1 using 70 g. of 4-chlorobenzaldehyde, 53 g. of beta-mercaptopropionic acid, 25 g. of ethylamine, 500 cc. of benzene and a reflux period of thirty-six hours. There was thus obtained 47 g. of product, 2-(4-chlorophenyl)-3-ethyl-4-metathiazanone, M.P. 103.6–107.2° C. (corr.) when recrystallized from benzene-n-hexane.

*Analysis.*—Calcd. for C$_{12}$H$_{14}$ClNOS: Cl, 13.86; N, 5.48. Found: Cl, 13.98; N, 5.43.

2-(4-chlorophenyl)-3-ethyl-4-metathiazanone suspended in an aqueous 1% gum tragacanth solution was found to increase the hexobarbital sodium-induced sleeping time in mice by about 56% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at dose levels of 100 mg. per kg. and 400 mg. per kg. prevented death in 1 out of 10 and 5 out of 10 mice, respectively, which were treated with fatal doses of strychnine hydrochloride given intravenously 30 minutes after adminisrtation of the metathiazanone.

*Example 35*

2-(4-chlorophenyl)-3-methyl-4-metathiazanone. — This preparation was carried out following the procedure given in Example 1 using 42 g. of 4-chlorobenzaldehyde, 31.8 g. of beta-mercaptopropionic acid, 34.4 cc. of methylamine, 400 ml. of benzene and a reflux period of seven hours. There was thus obtained 8 g. of product, 2-(4-chlorophenyl)-3-methyl-4-metathiazanone, distilling at 172–175° C. at 0.2 mm.

*Analysis.*—Calcd. for C$_{11}$H$_{12}$ClNOS: S, 13.27; Cl, 14.67. Found: S, 13.24; Cl, 14.43.

2 - (4 - chlorophenyl) - 3-methyl-4-metathiazanone suspended in an aqueous 1% gum tragacanth solution was found to increase the hexobarbital sodium-induced sleeping time in mice by about 52%, 126% and 203% when administered intraperitoneally (30 minutes before the intravenous administration of 60 mg. per kg. of hexobarbital sodium) at dose levels of 25, 50 and 100 mg. per kg., respectively. Also, this compound when administered intraperitoneally as a suspension in an aqueous 1% gum tragacanth solution at dose levels of 100 mg. per kg. and 400 mg. per kg. prevented death in 1 out of 10 and 7 out of 9 mice, respectively, which were treated with fatal doses of strychnine hydrochloride given intravenously 30 minutes after administration of the metathiazanone.

The intraperitoneal dose of 2-(4-chlorophenyl)-3-methyl-4-metathiazanone required to protect 5 out of 10 mice (i.p.PD$_{50}$) from the hind limb extensor component of maximal electroshock seizures was found to be 100±16 mg. per kg. using essentially the method described by Swinyard et al., ibid.

*Example 36*

2 - (4 - chlorophenyl) - 3-n-propyl-4-metathiazanone.— The preparation of this compound was carried out following the procedure given in Example 1 using 28 g. of 4-chlorobenzaldehyde, 21.2 g. of beta-mercaptopropionic acid, 12 g. of n-propylamine, 250 cc. of benzene and a reflux period of forty-five hours. There was thus obtained 13.5 g. of product, 2-(4-chlorophenyl)-3-n-propyl-4-metathiazanone, distilling at 164–167° C. at 0.2 mm.

*Analysis.*—Calcd. for C$_{13}$H$_{16}$ClNOS: S, 11.87; Cl, 13.13. Found: S, 12.04; Cl, 12.98.

2-(4-chlorophenyl)-3-n-propyl-4-metathiazanone when administered intraperitoneally as a suspension in an aqueous 1% gum tragacanth solution at a dose level of 400 mg. per kg. prevented death in 1 out of 10 mice which were treated with fatal doses of strychnine hydrochloride given intravenously 60 minutes after administration of the metathiazanone.

*Example 37*

2 - (4 - methoxyphenyl)-3-methyl-4-metathiazanone.— This preparation was carried out following the procedure given in Example 1 using 27.3 g. of 4-methoxybenzaldehyde, 21.2 g. of beta-mercaptopropionic acid, 23 cc. of methylamine, 200 cc. of benzene and a reflux period of twenty-six hours. There was thus obtained 6 g. of product, 2 - (4 - methoxyphenyl) - 3-methyl-4-metathiazanone, M.P. 67.2–69.6° C. (corr.) when recrystallized from n-heptane.

*Analysis.*—Calcd. for C$_{12}$H$_{15}$NO$_2$S: S, 13.51; N, 5.90. Found: S, 13.35; N, 6.12.

*Example 38*

2-phenyl-3-methyl-4-metathiazanone.—This preparation was carried out following the procedure given in Example 1 using 21.2 g. of benzaldehyde, 21.2 g. of beta-mercaptopropionic acid, 6.5 g. of methylamine in methanol, 250 cc. of benzene and a reflux period of twelve hours. There was thus obtained 22 g. of product, 2-phenyl-3-methyl-4-metathiazanone, M.P. 95.2–96.2° C. (corr.) when recrystallized from n-heptane.

*Analysis.*—Calcd. for C$_{11}$H$_{13}$NOS: S, 15.46; N, 6.75. Found: S, 15.50; N, 6.97.

2-phenyl-3-methyl-4-metathiazanone suspended in an aqueous 1% gum tragacanth solution was found to increase the hexobarbital sodium-induced sleeping time in mice by about 123% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death in 7 out of 10 mice which were treated with fatal doses of strychnine hydrochloride given intravenously 30 minutes after administration of the metathiazanone.

*Example 39*

2 - (4 - *methoxyphenyl*)-4-*metathiazanone*.—This preparation was carried out following the procedure described above in Example 17 using 21 g. of 4-methoxybenzaldehyde, 16 g. of beta-mercaptopropionic acid, 9 g. of powdered ammonium carbonate, 150 cc. of benzene and a reflux period of six hours. There was thus obtained 13 g. of the product, 2-(4-methoxyphenyl)-4-metathiazanone, M.P. 193.2–193.8° C. (corr.) when recrystallized from isopropyl alcohol.

*Analysis.*—Calcd. for $C_{11}H_{13}NO_2S$: S, 14.36; N, 6.28. Found: S, 14.44; N, 6.30.

2 - (4-methoxyphenyl)-4-metathiazanone suspended in an aqueous 1% gum tragacanth solution was found to increase the hexobarbital sodium-induced sleeping time in mice by about 44% when administered intraperitoneally (30 minutes before the intravenous administration of 60 mg. per kg. of hexobarbital sodium) at a dose level of 100 mg. per kg.

*Example 40*

2 - (*4-bromophenyl*)-*4-metathiazanone*.—This preparation was carried out following the procedure described above in Example 17 using 27.8 g. of 4-bromobenzaldehyde, 16 g. of beta-mercaptopropionic acid, 9 g., of powdered ammonium carbonate, 150 cc. of benzene and a reflux period of three hours. There was thus obtained 14 g. of product, 2-(4-bromophenyl)-4-metathiazanone, M.P. 184.3–185.5° C. (corr.) when recrystallized from benzene.

*Analysis.*—Calcd. for $C_{10}H_{10}BrNOS$: S, 11.78; Br, 29.36. Found: S, 11.86; Br, 29.25.

This compound was found to have an acute oral toxicity ($ALD_{50}$) in mice of greater than 2000 mg. per kg.

*Example 41*

2-(*3,4-dichlorophenyl*)-*4-metathiazanone*.—This preparation was carried out following the procedure described above in Example 17 using 26 g. of 3,4-dichlorobenzaldehyde, 16 g. of beta-mercaptopropionic acid, 9 g. of powdered ammonium carbonate, 150 cc. of benzene and a reflux time of twenty-four hours. There was thus obtained 14 g. of product, 2-(3,4-dichlorophenyl)-4-metathiazanone, M.P. 149.3–151.1° C. (corr.) when recrystallized from benzene.

*Analysis.*—Calcd. for $C_{10}H_9Cl_2NOS$: S, 12.23; Cl, 27.05. Found: S, 12.15; Cl, 27.20.

2-(3,4-dichlorophenyl)-4-metathiazanone suspended in an aqueous 1% gum tragacanth solution was found to increase the hexobarbital sodium-induced sleeping time in mice by about 179% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death of 2 out of 6 mice which were treated with fatal doses of strychnine hydrochloride given intravenously 60 minutes after administration of the metathiazanone. 2- (3,4 - dichlorophenyl)-4-metathiazanone was found to have an acute oral toxicity ($ALD_{50}$) in mice of greater than 2000 mg. per kg.

*Example 42*

2-(*2,4-dichlorophenyl*)-*4-metathiazanone*.—The preparation of this compound was carried out following the procedure described above in Example 17 using 26 g. of 2,4-dichlorobenzaldehyde, 16 g. of beta-mercaptopropionic acid, 9 g. of powdered ammonium carbonate, 150 cc. of benzene and a reflux period of sixteen hours. There was thus obtained 7 g. of product, 2-(2,4-dichlorophenyl)-4-metathiazanone, M.P. 166.9–168.7° C. (corr.) when recrystallized from benzene.

*Analysis.*—Calcd. for $C_{10}H_9Cl_2NOS$: S, 12.23; Cl, 27.05. Found: S, 12.32; Cl, 27.50.

2-(2,4-dichlorophenyl)-4-metathiazanone suspended in an aqueous 1% gum tragacanth solution was found to increase the hexobarbital sodium-induced sleeping time in mice by about 72% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at dose levels of 100 mg. per kg. and 400 mg. per kg. prevented death of 1 out of 10 and 6 out of 7 mice, respectively, which were treated with fatal doses of strychnine hydrochloride given intravenously 60 minutes after administration of the metathiazanone. 2-(2,4-dichlorophenyl)-4-metathiazanone was found to have an acute oral toxicity ($ALD_{50}$) in mice of greater than 2000 mg. per kg.

*Example 43*

2-(*4 - chlorophenyl*)-*4-metathiazanone*.—This preparation was carried out following the procedure described above in Example 17 using 21 g. of 4-chlorobenzaldehyde, 16 g. of beta-mercaptopropionic acid, 9 g. of powdered ammonium carbonate, 150 cc. of benzene and a reflux period of twenty hours. There was thus obtained 8.5 g. of product, 2-(4-chlorophenyl)-4-metathiazanone, M.P. 174.9–175.7° C. (corr.) when recrystallized from benzene.

*Analysis.*—Calcd. for $C_{10}H_{10}ClNOS$: S, 14.08; Cl, 15.57. Found: S, 14.19; Cl, 15.20.

2-(4-chlorophenyl)-4-metathiazanone suspended in an aqueous 1% gum tragacanth solution was found to increase the hexobarbital sodium-induced sleeping time in mice by about 32% when administered intraperitoneally (30 minutes before the intravenous administration of 60 mg. per kg. of hexobarbital sodium) at a dose level of 100 mg. per kg. This compound was found to have an acute oral toxicity ($ALD_{50}$) in mice of greater than 2000 mg. per kg.

*Example 44*

2-(*lower-aromatic*)-*3-hydrocarbyl* - *4* - *metathiazanone*-*1-dioxides*.—The preparation of these compounds is illustrated by the following preparation of 2-(4-chlorophenyl)-3-methyl-4-metathiazanone-1-dioxide: A solution of 11.2 g. of potassium permanganate in 100 cc. of warm water was added dropwise to a well stirred solution of 10 g. of 2-(4-chlorophenyl)-3-methyl-4-metathiazanone in 50 cc. of glacial acetic acid. The temperature was kept below 30° C. with external cooling. An aqueous sodium bisulfite solution was then added to remove the manganese dioxide. The thick whitish oil which separated was taken up in chloroform, and the extract was washed with water. Removal of the chloroform by distillation in vacuo yielded an oily residue which solidified. The solid was recrystallized from isopropyl alcohol to give 5 g. of the product, 2-(4-chlorophenyl)-3-methyl-4-metathiazanone-1-dioxide, M.P. 116.2–118.6° C. (corr.).

*Analysis.*—Calcd. for $C_{11}H_{12}ClNO_3S$: S, 11.71; Cl, 12.95. Found: S, 11.88; Cl, 13.20.

In subsequent runs of the above procedure the solid product was obtained upon the addition of the bisulfite solution.

2-(4-chlorophenyl)-3-methyl - 4 - metathiazanone-1-dioxide suspended in an aqueous 1% gum tragacanth solution was found to increase the hexobarbital sodium-induced sleeping time in mice by about 6%, 63% and 143% when administered intraperitoneally (30 minutes before the intravenous administration of 60 mg. per kg. of hexobarbital sodium) at dose levels of 25, 50 and 100 mg. per kg., respectively. Also, this compound when administered intraperitoneally as a suspension in an aqueous 1% gum tragacanth solution at dose levels of 100 mg. per kg. and 200 mg. per kg. prevented death of 12 out of 20 and 8 out of 10 mice, respectively, which were treated with fatal doses of strychnine hydrochloride given intravenously 60 minutes after administration of the metathiazanone; this is an illustration of central nervous system depressant and anticonvulsant activities of this compound. 2 - (4-chlorophenyl)-3-methyl-4-metathiazanone-1-dioxide was found to have an acute oral toxicity ($LD_{50}$) in mice of 1680±206 mg. per kg. after 24 hours and 1380±190 mg. per kg. after 7 days.

2-(4-chlorophenyl)-3-methyl - 4 - metathiazanone-1-dioxide dissolved in 30–50% aqueous propylene glycol as a 1% solution, in doses of 10–20 mg. per kg., reduced or abolished the crossed extensor reflex in the acute spinal cat without effecting the monosynaptic knee jerk reflex. This compound is thus shown to have interneurone blocking activity (spinal cord depression).

The intraperitoneal dose of 2-(4-chlorophenyl)-3-methyl-4-metathiazanone-1-dioxide required to protect 5 out of 10 mice (i.p.$PD_{50}$) from the hind limb extensor component of maximal electroshock seizures was found to be 45±8 mg. per kg. using essentially the method described by Swinyard et al., ibid. This procedure further demonstrates anticonvulsant properties of this compound.

The oral dose of this compound required to lower the rectal temperature in mice 5° F. ($ED_{50}$) was found to be 280 mg. per kg. The compound was administered orally as a suspension in an aqueous 1% gum tragacanth solution at dose levels of 50, 100, 200 and 400 mg. per kg., using 10 mice at each dose level.

Other 2-(lower-aromatic)-3-hydrocarbyl-4-metathiazanone-1-dioxides that can be prepared according to the foregoing procedure described in Example 44 for the preparation of 2-(4-chlorophenyl)-3-methyl-4-metathiazanone-1-dioxide using the appropriate intermediate 2-(lower-aromatic)-3-hydrocarbyl-4-metathiazanone are the following compounds of Examples 45–59.

*Example 45*

2-(2-chlorophenyl)-3-isobutyl - 4 - metathiazanone-1-dioxide is obtained following the procedure described in Example 44 using 2-(2-chlorophenyl)-3-isobutyl-4-metathiazanone.

*Example 46*

2-(3,4-dibromophenyl) - 3 - n - hexyl-5,5,6-trimethyl-4-metathiazanone-1-dioxide is obtained following the procedure described in Example 44 using 2-(3,4-dibromophenyl)-3-n-hexyl-5,5,6-trimethyl-4-metathiazanone.

*Example 47*

2 - (3,4-dichlorophenyl)-3-methyl-5-ethyl-6-isopropyl-4 - metathiazanone-1-dioxide is obtained following the procedure described in Example 44 using 2-(3,4-dichlorophenyl)-3-methyl-5-ethyl-6-isopropyl-4-metathiazanone.

*Example 48*

2 - (4-iodophenyl)-3-methyl-5-n-propyl-6-ethyl-4-metathiazanone-1-dioxide is obtained following the procedure described in Example 44 using 2 - (4 - iodophenyl)-3-methyl-5-n-propyl-6-ethyl-4-metathiazanone.

*Example 49*

2 - (4-fluorophenyl)-3-methyl-4-metathiazanone - 1-dioxide is obtained following the procedure described in Example 44 using 2 - (4-fluorophenyl)-3-methyl-4-metathiazanone.

*Example 50*

2 - (2,4,6-trichlorophenyl)-3-cyclohexyl-5,5-dimethyl-4-metathiazanone-1-dioxide is obtained following the procedure described in Example 44 using 2-(2,4,6-trichlorophenyl)-3-cyclohexyl-5,5-dimethyl-4-metathiazanone.

*Example 51*

2 - (4-n-butoxyphenyl)-3-cyclopropylmethyl - 4 - metathiazanone-1-dioxide is obtained following the procedure described in Example 44 using 2-(4-n-butoxyphenyl)-3-cyclopropylmethyl-4-metathiazanone.

*Example 52*

2 - (3,4,5 - trimethylphenyl)-3-allyl-4-metathiazanone-1-dioxide is obtained following the procedure described in Example 44 using 2-(3,4,5-trimethylphenyl)-3-allyl-4-metathiazanone.

*Example 53*

2 - (3,4,5 - trimethoxyphenyl)-3-methyl - 4 - metathiazanone-1-dioxide is obtained following the procedure described in Example 44 using 2-(3,4,5-trimethoxyphenyl)-3-methyl-4-metathiazanone.

*Example 54*

2 - (para - tolyl)-3,5,5,6-tetramethyl-4-metathiazanone-1-dioxide is obtained following the procedure described in Example 44 using 2-(para-tolyl)-3,5,5,6-tetramethyl-4-metathiazanone.

*Example 55*

2 - (2 - chloro-4-ethoxyphenyl)-3-methyl-4-metathiazanone-1-dioxide is obtained following the procedure described in Example 44 using 2-(2-chloro-4-ethoxyphenyl)-3-methyl-4-metathiazanone.

*Example 56*

2 - (3 - ethyl - 4 - isopropylphenyl)-3,5-diethyl-4-metathiazanone-1-dioxide is obtained following the procedure described in Example 44 using 2-(3-ethyl-4-isopropylphenyl)-3,5-diethyl-4-metathiazanone.

*Example 57*

2 - (4 - n - hexylphenyl)3,5-diisopropyl-6-methyl-4-metathiazanone-1-dioxide is obtained following the procedure described in Example 44 using 2 - (4-n-hexylphenyl)-3,5-diisopropyl-6-methyl-4-metathiazanone.

*Example 58*

2 - (2 - naphthyl)-3-methyl-4-metathiazanone-1-dioxide is obtained following the procedure described in Example 44 using 2-(2-naphthyl)-3-methyl-4-metathiazanone.

*Example 59*

2 - (1 - biphenylyl)-3-methyl-4-metathiazanone-1-dioxide is obtained following the procedure described in Example 44 using 2 - (1-biphenylyl)-3-methyl-4-metathiazanone.

*Example 60*

*2 - (lower - aromatic)-4-metathiazanone-1-dioxides.*—The preparation of these compounds is illustrated by the following synthesis of 2-(3,4-dichlorophenyl)-4-metathiazanone-1-dioxide: A solution of 5.6 g. of potassium permanganate in 65 cc. of warm water was added dropwise to a well stirred solution of 5.5 g. of 2-(3,4-dichlorophenyl)-4-metathiazanone in 50 cc. of glacial acetic acid. The temperature was kept below 30° C. with external cooling. After addition of excess aqueous sodium bisulfite solution to remove the manganese dioxide a light tan solid was obtained. The solid was collected, washed with water and dried at 90° C. for twenty-four hours to yield 5 g. of product, 2-(3,4-dichlorophenyl)-4-metathiazanone-1-dioxide, M.P. 184.3–185.3° C. (corr.).

*Anal.*—Calcd. for $C_{10}H_9Cl_2NO_3S$: S, 13.90; Cl, 24.10. Found: S, 11.19; Cl, 24.15.

2 - (3,4 - dichlorophenyl)-4-metathiazanone-1-dioxide suspended in an aqueous 1% gum tragacanth solution was found to increase the hexobarbital sodium-induced sleeping time in mice by about 174% when administered intraperitoneally (30 minutes before the intravenous administration of 69 mg. per kg. of hexobarbital sodium) at a dose level of 100 mg. per kg.

Other 2-(lower-aromatic)-4-metathiazanone-1-dioxides that can be prepared according to the foregoing procedure described in Example 60 for the preparation of 2-(3,4-dichlorophenyl) - 4 - metathiazanone-1-dioxide using the corresponding intermediate 2 - (lower-aromatic)-4-metathiazanones are the following compounds of Examples 61–74.

Example 61

2 - (3-chlorophenyl)-5-methyl-4-metathiazanone-1-dioxide is obtained following the procedure described in Example 60 using 2 - (3-chlorophenyl)-5-methyl-4-metathiazanone.

Example 62

2 - (3,4 - dibromophenyl)-6-methyl-4-metathiazanone-1-dioxide is obtained following the procedure described in Example 60 using 2 - (3,4 - dibromophenyl)-6-methyl-4-metathiazanone.

Example 63

2 - (3,4 - dichlorophenyl)-5-ethyl-6-n-propyl-4-metathiazanone-1-dioxide is obtained following the procedure described in Example 60 using 2-(3,4-dichlorophenyl)-5-ethyl-6-n-propyl-4-metathiazanone.

Example 64

2 - (4 - iodophenyl) - 4 - metathiazanone-1-dioxide is obtained following the procedure described in Example 60 using 2-(4-iodophenyl)-4-metathiazanone.

Example 65

2 - (4 - fluorophenyl) - 4 - metathiazanone-1-dioxide is obtained following the procedure described in Example 60 using 2-(4-fluorophenyl)-4-metathiazanone.

Example 66

2 - (2,4,6 - trichlorophenyl)-5,6-dimethyl-4-methathiazanone-1-dioxide is obtained following the procedure described in Example 60 using 2-(2,4,6-trichlorophenyl)-5,6-dimethyl-4-metathiazanone.

Example 67

2-(4-isobutoxyphenyl)-5,5,6-trimethyl - 4 - metathiazanone-1-dioxide is obtained following the procedure described in Example 60 using 2-(4-isobutoxyphenyl)-5,5,6-trimethyl-4-metathiazonone.

Example 68

2-(3,4,5-trimethylphenyl)-5,5,6-trimethyl-4 - metathiazanone-1-dioxide is obtained following the procedure described in Example 60 using 2-(3,4,5-trimethylphenyl)-5,5,6-trimethyl-4-metathiazanone.

Example 69

2-(4-ethylphenyl)-5,5-diethyl-4-metathiazanone - 1 - dioxide is obtained following the procedure described in Example 60 using 2-(4-ethylphenyl)-5,5-diethyl-4-metathiazanone.

Example 70

2-(3-ethyl-4-isopropoxyphenyl)-5-isopropyl - 4 - metathiazanone-1-dioxide is obtained following the procedure described in Example 60 using 2-(3-ethyl-4-isopropoxyphenyl)-5-isopropyl-4-metathiazanone.

Example 71

2-(3-ethoxy-4-chlorophenyl)-4-metathiazanone - 1 - dioxide is obtained following the procedure described in Example 60 using 2-(3-ethoxy-4-chlorophenyl)-4-metathiazanone.

Example 72

2-(3-n-hexylphenyl)-5-methyl - 4 - metathiazanone - 1-dioxide is obtained following the procedure described in Example 60 using 2-(3-n-hexylphenyl)-5-methyl-4-metathiazanone.

Example 73

2-(1-naphthyl)-4-metathiazanone-1-dioxide is obtained following the procedure described in Example 60 using 2-(1-naphthyl)-4-metathiazanone.

Example 74

2-(2-biphenylyl)-4 - metathiazanone - 1 - dioxide is obtained following the procedure described in Example 60 using 2-(2-biphenylyl)-4-metathiazanone.

Example 75

*2-(3,4-dichlorophenyl)-3-methyl-4-metathiazanone - 1-dioxide.*—This compound was prepared following the procedure given above in Example 44 using 26 g. of potassium permanganate, 150 cc. of water, 26.5 g. of 2-(3,4-dichlorophenyl)-3-methyl-4-metathiazanone and 120 cc. of glacial acetic acid. There was thus obtained 18 g. of product, 2-(3,4-dichlorophenyl)-3-methyl - 4 - metathiazanone - 1-dioxide, M.P. 122.5–126.1° C. (corr.) when recrystallized from isopropyl alcohol.

*Anal.*—Calcd. for $C_{11}H_{11}Cl_2NO_3S$: C, 42.86; H, 3.60; Cl, 23.01. Found: C, 42.70; H, 3.99; Cl, 22.60.

2-(3,4-dichlorophenyl)-3-methyl-4-metathiazanone - 1-dioxide suspended in an aqueous 1% gum tragacanth solution was found to increase the hexobarbital sodium-induced sleeping time in mice by about 79%, 192% and 422% when administered intraperitoneally (30 minutes before the intravenous administration of 60 mg. per kg. of hexobarbital sodium) at dose levels of 25, 50 and 100 mg. per kg., respectively. Also, this compound when administered intraperitoneally as a suspension in an aqueous 1% gum tragacanth solution at a dose level of 100 mg. per kg. prevented death of 4 out of 9 mice which were treated with fatal doses of strychnine hydrochloride given intravenously 60 minutes after administration of the metathiazanone; this is an illustration of the central nervous system depressant and anticonvulsant activities of this compound. 2-(3,4-dichlorophenyl)-3-methyl - 4 - metathiazanone-1-dioxide was found to have an acute toxicity ($LD_{50}$) in mice of 1680±244 mg. per kg. after 24 hours and 840±183 mg. per kg. after 7 days when administered orally as a suspension in an aqueous 1% gum tragacanth solution.

2 - (3,4 - dichlorophenyl) - 3 - methyl - 4 - metathiazanone-1-dioxide dissolved in 30–50% aqueous propylene glycol as a 1% solution, in doses of 10–20 mg. per kg. reduced or abolished the crossed extensor reflex in the acute spinal cat without effecting the monosynaptic knee jerk reflex, thus illustrating internuncial blocking activity (spinal cord depression) of this compound.

The intraperitoneal dose of 2-(3,4-dichlorophenyl)-3-methyl-4-metathiazanone-1-dioxide required to protect 5 out of 10 mice (i.p. $PD_{50}$) from the hind limb extensor component of maximal electroshock seizures was found to be 36±2.3 mg. per kg. using essentially the method described by Swinyard et al., ibid. This procedure further demonstrates the anticonvulsant properties of this compound.

The oral dose of this compound required to lower the rectal temperature in mice 5° F. ($ED_{5°}$) was found to be 190 mg. per kg. The compound was administered orally as a suspension in an aqueous 1% gum tragacanth solution at dose levels of 50, 100, 200 and 400 mg. per kg., using 10 mice at each dose level. The rectal temperature was measured by means of a calibrated thermocouple at one, two, four and six hour intervals following administration. This procedure demonstrates central nervous system depressant activity of this compound.

Example 76

*2 - (2,4-dichlorophenyl) - 3 - methyl - 4 - metathiazanone-1-dioxide.*—This compound was prepared following the procedure given above in Example 44 using 25.2 g. of potassium permanganate, 150 cc. of water, 25.8 g. of 2-(2,4-dichlorophenyl)-3-methyl-4-metathiazanone and 110 cc. of glacial acetic acid. There was thus obtained 19.5 g. of product, 2-(2,4-dichlorophenyl)-3-methyl-4-metathiazanone-1-dioxide, M.P. 135.4–137.7° C. (corr.) when recrystallized from isopropyl alcohol.

*Anal.*—Calcd. for $C_{11}H_{11}Cl_2NO_3S$: S, 10.40; Cl, 23.01. Found: S, 10.62; Cl, 22.70.

2 - (2,4 - dichlorophenyl) - 3 - methyl - 4 - metathiazanone-1-dioxide suspended in an aqueous 1% gum tragacanth solution was found to increase the hexobarbital sodium-induced sleeping time in mice by about 46%, 70% and 289% when administered intraperitoneally (30 minutes before the intravenous administration of 60 mg. per kg. of hexobarbital sodium) at dose levels of 25, 50 and 100 mg. per kg. Also, this compound when administered intraperitoneally as a suspension in an aqueous 1% gum tragacanth solution at dose levels of 100 mg. per kg. and 400 mg. per kg. prevented death of 5 out of 10 and 8 out of 10 mice, respectively, which were treated with fatal doses of strychnine hydrochloride given intravenously 60 minutes after administration of the metathiazanone. 2-(2,4-dichlorophenyl)-3-methyl-4-metathiazanone-1-dioxide was found to have an acute toxicity ($ALD_{50}$) in mice of about 3490 mg. per kg. after 24 hours and about 3000 mg. per kg. after 7 days when administered orally as a suspension in an aqueous 1% gum tragacanth solution.

The intraperitoneal dose of 2-(2,4-dichlorophenyl)-3-methyl-4-metathiazanone-1-dioxide required to protect 5 out of 10 mice (i.p. $PD_{50}$) from the hind limb extensor component of maximal electroshock seizures was found to be $71\pm7.9$ mg. per kg. using essentially the method described by Swinyard et al., ibid.

The oral dose of this compound required to lower the rectal temperature in mice 5° F. ($ED_{5°}$) was found to be 360 mg. per kg. The compound was administered and the rectal temperature determined according to the procedure described in Example 75.

Example 77

*2-phenyl-3-methyl-4-metathiazanone-1-dioxide.* — This preparation was carried out following the procedure given in Example 44 using 4.5 g. of potassium permanganate, 50 cc. of water, 7 g. of 2-phenyl-3-methyl-4-metathiazanone and 65 ml. of glacial acetic acid. There was thus obtained 5.5 g. of product, 2-phenyl-3-methyl-4-metathiazanone-1-dioxide, M.P. 174.9–175.7° C. (corr.).

*Anal.*—Calcd. for $C_{11}H_{13}NO_3S$: S, 13.40; N, 5.85. Found: S, 13.27; N, 5.95.

2-phenyl-3-methyl-4-metathiazanone - 1 - dioxide when administered orally as a suspension in an aqueous 1% gum tragacanth solution was found to lower the rectal temperature in mice 1.8° F. at a dose level of 400 mg. per kg, using 10 mice at the dose level. The rectal temperature was measured by means of a calibrated thermocouple at one, two, four and six hour intervals following administration.

Example 78

*2-(4-methoxyphenyl)-3-methyl-4-metathiazanone - 1-dioxide.*—This preparation was carried out following the procedure given in Example 44 using 10.1 g. of potassium permanganate, 100 cc. of water, 9 g. of 2-(4-methoxyphenyl)-3-methyl-4-metathiazanone and 80 ml. of glacial acetic acid. There was thus obtained 6 g. of product, 2-(4-methoxyphenyl)-3-methyl-4 - metathiazanone - 1 - dioxide, M.P. 132.4–133.4° C. (corr.) when recrystallized from ethyl alcohol.

*Anal.*—Calcd. for $C_{12}H_{15}NO_4S$: S, 11.92; N, 5.20. Found: S, 11.78; N, 5.20.

2-(4-methoxyphenyl)-3-methyl-4-metathiazanone-1 - dioxide when administered intraperitoneally as a suspension in an aqueous 1% gum tragacanth solution at a dose level of 400 mg. per kg. prevented death of 4 out of 10 mice which were treated with fatal doses of strychnine hydrochloride given intravenously 30 minutes after administration of the metathiazanone.

The intraperitoneal dose of 2-(4-methoxyphenyl)-3-methyl-4-metathiazanone-1-dioxide required to protect 5 out of 10 mice (i.p. $PD_{50}$) from the hind limb extensor component of maximal electroshock seizures was found to be $220\pm34$ mg. per kg. using essentially the method described by Swinyard et al., ibid.

Example 79

*2-(4-chlorophenyl)-3-n-propyl-4-metathiazanone - 1-dioxide.*—This preparation was carried out following the procedure given in Example 44 using 5 g. of potassium permanganate, 50 cc. of water, 5 g. of 2-(4-chlorophenyl)-3-n-propyl-4-metathiazanone and 25 cc. of glacial acetic acid. There was thus obtained 5 g. of product, 2-(4-chlorophenyl)-3-n-propyl - 4 - metathiazanone - 1 - dioxide, M.P. 110.4–112.2° C. (corr.) when recrystallized from isopropyl alcohol.

*Anal.*—Calcd. for $C_{13}H_{16}ClNO_3S$: S, 10.62; Cl, 11.74. Found: S, 10.62; Cl, 11.67.

2-(4-chlorophenyl)-3-n-propyl-4-metathiazanone-1 - dioxide suspended in an aqueous 1% gum tragacanth solution was found to increase the hexobarbital sodium-induced sleeping time in mice by about 170% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death of 3 out of 7 mice which were treated with fatal doses of strychnine hydrochloride given intravenously 60 minutes after administration of the metathiazanone. 2-(4-chlorophenyl)-3-n-propyl-4 - metathiazanone-1-dioxide was found to have an acute intraperitoneal toxicity ($ALD_{50}$) in mice of about 1500 mg. per kg. after 24 hours and about 1250 mg. per kg. after 7 days.

Example 80

*2-(4-isopropylphenyl)-3-methyl-4 - metathiazanone - 1-dioxide.*—This preparation was carried out following the procedure given in Example 44 using 21.2 g. of potassium permanganate, 150 cc. of water, 19.5 g. of 2-(4-isopropylphenyl)-3-methyl-4-metathiazanone and 100 cc. of glacial acetic acid. There was thus obtained 15 g. of product, 2-(4-isopropylphenyl)-3-methyl-4-metathiazanone - 1 - dioxide, M.P. 152.9–157.3° C. (corr.).

*Anal.*—Calcd. for $C_{14}H_{19}NO_3S$: C, 59,75; H, 6.80; S, 11.39. Found: C, 59.98; H, 6.80; S, 11.18.

2-(4-isopropylphenyl)-3-methyl-4 - metathiazanone - 1-dioxide suspended in an aqueous 1% gum tragacanth solution was found to increase the hexobarbital sodium-induced sleeping time in mice by about 185% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death of 2 out of 8 mice which were treated with fatal doses of strychnine hydrochloride given intravenously 60 minutes after administration of the metathiazanone. 2-(4-isopropylphenyl)-3-methyl-4-metathiazanone-1-dioxide was found to have an acute oral toxicity ($ALD_{50}$) in mice of about 6000 mg. per kg. after 24 hours and about 4000 mg. per kg. after 7 days.

The intraperitoneal dose of 2-(4-isopropylphenyl)-3-methyl-4-metathiazanone-1-dioxide required to protect 5 out of 10 mice (i.p. $DP_{50}$) from the hind limb extensor component of maximal electroshock seizures was found to be $212\pm37$ mg. per kg. using essentially the method described by Swinyard et al., ibid.

Example 81

*2-(4-chlorophenyl)-3-ethyl-4-metathiazanone - 1 - dioxide.*—This preparation was carried out following the procedure given in Example 44 using 15.8 g. of potassium permanganate, 300 cc. of water, 15 g. of 2-(4-chlorophenyl)-3-ethyl-4-metathiazanone and 100 cc. of glacial acetic acid. There was thus obtained 11 g. of product, 2-(4-chlorophenyl)-3-ethyl-4-metathiazanone - 1 - dioxide, M.P. 157.6–159.3° C. (corr.) when recrystallized from ethyl alcohol.

*Anal.*—Calcd. for $C_{12}H_{14}ClNO_3S$: Cl. 12.32; N, 4.87. Found: Cl, 12.47; N, 4.90.

2-(4-chlorophenyl) - 3 - ethyl - 4 - metathiazanone - 1-dioxide suspended in an aqueous 1% gum tragacanth solution was found to increase the hexobarbital sodium-induced sleeping time in mice by about 167% when administered intraperitoneally (30 minutes before the intravenous administration of 60 mg. per kg. of hexobarbital sodium) at a dose level of 100 mg. per kg. Also, this compound when administered intraperitoneally as a suspension in an aqueous 1% gum tragacanth solution at a dose level of 400 mg. per kg. prevented death of 6 out of 10 mice which were treated with fatal doses of strychnine hydrochloride given intravenously 30 minutes after administration of the metathiazanone.

Example 82

*2-(4 - chlorophenyl)-4-metathiazanone - 1 - dioxide.*—This preparation was carried out following the procedure given in Example 60 using 6.6 g. of potassium permanganate, 70 cc. of water, 6.5 g. of 2-(4-chlorophenyl)-4-metathiazonone and 50 cc. of glacial acetic acid. There was thus obtained 6.5 g. of product, 2-(4-chlorophenyl)-4-metathiazanone-1-dioxide, M.P. 173.0–173.6° C. (corr.) when dried at 90° C. for twenty-four hours.

*Anal.*—Calcd. for $C_{10}H_{10}ClNO_3S$: C, 12.34; Cl, 13.65. Found: C, 12.20; Cl, 13.41.

2-(4-chlorophenyl) - 4 - metathiazanone-1-dioxide suspended in an aqueous 1% gum tragacanth solution was found to increase the hexobarbital sodium-induced sleeping time in mice by about 72% when administered intraperitoneally (30 minutes before the intravenous administration of 60 mg. per kg. of hexobarbital sodium) at a dose of 100 mg. per kg.

Example 83

*2-(4 - bromophenyl) - 4 - metathiazanone-1-dioxide.*—This preparation was carried out following the procedure given in Example 60 using 4.5 g. of potassium permanganate, 60 cc. of water, 5 g. of 2-(4-bromophenyl)-4-metathiazanone and 60 cc. of glacial acetic acid. There was thus obtained 5 g. of product, 2-(4-bromophenyl)-4 - metathiazanone - 1 - dioxide, M.P. 176.1–177.1° C. (corr.).

*Anal.*—Calcd. for $C_{10}H_{10}BrNO_3$ S: S, 10.54; Br, 26.27. Found: S, 10.48; Br, 25.95.

Example 84

*2 - phenyl-4-metathiazanone-1-dioxide.*—This preparation was carried out following the procedure given in Example 60 using 28 g. of potassium permanganate, 200 cc. of water, 19 g. of 2-phenyl-4-metathiazanone and 80 cc. of glacial acetic acid. There was thus obtained 6 g. of product, 2-phenyl-4-metathiazanone-1-dioxide, M.P. 153.9–155.5° C. (corr.) when recrystallized from acetic acid.

*Anal.*—Calcd. for $C_{10}H_{11}NO_3S$: S, 14.23; N, 6.21. Found: S, 13.94; N, 6.23.

2-phenyl-4-metathiazanone - 1 - dioxide when administered orally as a suspension in an aqueous 1% gum tragacanth solution was found to lower the rectal temperature in mice 9.8° C. at 200 mg. per kg., using 10 mice at the dose level. The rectal temperature was measured by means of a calibrated thermocouple at one, two, four and six hour intervals following administration. 2-phenyl-4-metathiazanone-1-dioxide was found to have an acute intraperitoneal toxicity ($LD_{50}$) in mice of 214±54 mg. per kg.

Example 85

*2-phenyl-3-benzyl - 4 - metathiazanone.*—A mixture of 10.6 g. of benzaldehyde and 10.7 g. of benzylamine in 100 cc. of benzene was refluxed with a water separator connected to the apparatus. After 1.8 cc. of water had been collected, 10.6 g. of beta-mercaptopropionic acid was added to the reaction mixture and refluxing was continued for an additional twenty-one hours, after which time a total of 2.9 cc. of water had been collected. The reaction mixture was poured with stirring into 200 cc. of water containing 9 cc. of concentrated ammonium hydroxide. The benzene layer was separated and the solvent removed by distilling under reduced pressure to leave a residue of 19.3 g. The residue was distilled at 154–200° C. at 0.5 mm. to yield a product which solidified on standing. Recrystallization of the solid from n-hexane yielded 2.5 g. of 2-phenyl-3-benzyl-4-metathiazanone, M.P. 82.9–84.5° C. (corr.).

*Anal.*—Calcd. for $C_{17}H_{17}NOS$: S, 11.31; N, 4.94. Found: S, 11.41; N, 5.18.

Example 86

*2-phenyl-3-benzyl - 4 - metathiazanone - 1 - dioxide.*—This compound was prepared following the procedure given in Example 44 using 20.5 g. of potassium permanganate, 400 cc. of water, 21.6 g. of 2-phenyl-3-benzyl-4-metathiazanone and 150 cc. of glacial acetic acid. There was thus obtained 14 g. of product, 2-phenyl-3-benzyl-4-metathiazanone-1-dioxide, M.P. 158.4–161.2° C. (corr.) when recrystallized from ethanol.

*Anal.*—Calcd. for $C_{17}H_{17}NO_3S$: S, 10.17; C, 64.73; H, 5.43. Found: S, 10.04; C, 64.47; H, 4.95.

2-phenyl-3-benzyl-4-metathiazanone-1-dioxide when administered intraperitoneally as a suspension in an aqueous 1% gum tragacanth solution at a dose level of 400 mg. per kg. prevented death of 1 out of 10 mice which were treated with fatal doses of strychnine hydrochloride given intravenously 30 minutes after administration of the metathiazanone.

Example 87

*2-(2-chlorophenyl) - 3 - methyl - 4 - metathiazanone.*—This compound was prepared following the procedure given above in Example 1 using 28.1 g. of 2-chlorobenzaldehyde, 21.2 g. of beta-mercaptopropionic acid, 6.2 g of methylamine, 200 cc. of benzene and a reflux period of twenty-four hours. There was thus obtained 21.6 g. of product, 2-(2-chlorophenyl)-3-methyl-4-metathiazanone, B.P. 156–158° C. at 0.5 mm., $n_D^{25}=1.6072$. On trituration with n-hexane, the product solidified. It was recrystallized from n-heptane to give 18.8 g. of colorless prismatic rods, M.P. 76.4–79.6° C. (corr.).

*Anal.*—Calcd. for $C_{11}H_{12}ClNOS$: Cl, 14.68; C, 54.67; H, 5.01. Found: Cl, 14.54; C, 56.70; H, 4.86.

2-(2 - chlorophenyl)-3-methyl-4-metathiazanone when administered intraperitoneally as a suspension in an aqueous 1% gum tragacanth solution at a dose level of 400 mg. per kg. prevented death of 2 out of 10 mice which were treated with fatal doses of strychnine hydrochloride given intravenously 30 minutes after administration of the metathiazanone.

Example 88

*2 - (2 - chlorophenyl) - 3 - methyl - 4 - metathiazanone-1-dioxide.*—This compound was prepared following the procedure given above in Example 44 using 16 g. of potassium permanganate, 100 cc. of water, 14.5 g. of 2-(2-chlorophenyl)-3-methyl-4-metathiazanone and 100 cc. of glacial acetic acid. There was thus obtained 13 g. of product, 2-(2-chlorophenyl)-3-methyl-4-metathiazanone-1-dioxide, M.P. 172.8–175.4° C. (corr.) when recrystallized from ethyl alcohol.

*Anal.*—Calcd. for $C_{11}H_{12}ClNO_3S$: Cl, 12.95; S, 11.71. Found: Cl, 12.65; S, 11.80.

2 - (2 - chlorophenyl) - 3 - methyl - 4 - metathiazanone-1-dioxide when administered intraperitoneally as a suspension in an aqueous 1% gum tragacanth solution at dose levels of 100 mg. per kg. and 400 mg. per kg. prevented death of 1 out of 10 and 5 out of 10 mice, respectively, which were treated with fatal doses of strychnine hydrochloride given intravenously 30 minutes after administration of the metathiazanone.

Example 89

*2 - (3 - chlorophenyl) - 3 - methyl - 4 - metathiazanone.*—This compound was prepared following the procedure given above in Example 1 using 62.7 g. of 3-chlorobenzaldehyde, 47.2 g. of beta-mercaptopropionic acid, 15 g. of methylamine, 200 cc. of benzene and a reflux period of twenty-four hours. There was thus obtained 63.5 g. of product, 2-(3-chlorophenyl)-3-methyl-4-metathiazanone, as a pale yellow oil, B.P. 178–180° C. at 1 mm., $n_D^{25}=1.6060$.

*Anal.*—Calcd. for $C_{11}H_{12}ClNOS$: Cl, 14.68; C, 54.67; H, 5.01. Found: Cl, 14.72; C, 54.45; H, 5.04.

Example 90

*2 - (3 - chlorophenyl) - 3 - methyl - 4 - metathiazanone-1-dioxide.*—This compound was prepared following the procedure given above in Example 44 using 65.4 g. of potassium permanganate, 600 cc. of water, 58.3 g. of 2-(3-chlorophenyl)-3-methyl-4-metathiazanone and 400 cc. of glacial acetic acid. There was thus obtained 49.5 g. of product, 2-(3-chlorophenyl)-3-methyl-4-metathiazanone-1-dioxide, M.P. 152–154° C. when recrystallized from ethyl alcohol.

*Anal.*—Calcd. for $C_{11}H_{12}ClNO_3S$: Cl, 12.95; S, 11.71. Found: Cl, 12.96; S, 11.75.

2 - (3 - chlorophenyl) - 3 - methyl - 4 - metathiazonone-1-dioxide when administered orally as a suspension in an aqueous 1% tragacanth solution was found to lower the rectal temperature in mice 6.3° F. at 200 mg. per kg., using 10 mice at the dose level. The rectal temperature was measured by means of a calibrated thermocouple at one, two, four and six hour intervals following administration. 2-(3-chlorophenyl)-3-methyl-4-metathiazanone-1-dioxide was found to have an acute oral toxicity ($LD_{50}$) in mice of 4300±695 mg. per kg. and an acute intraperitoneal toxicity ($LD_{50}$) in mice of 1670±277 mg. per kg.

Example 91

*2 - (2 - thienyl) - 3 - methyl - 4 - metathiazanone.*—This compound was prepared following the procedure given above in Example 1 using 44.8 g. of 2-thiophenecarboxaldehyde, 42.5 g. of beta-mercaptopropionic acid, 14 g. of methylamine, 200 cc. of benzene and a reflux period of seventy-two hours. There was thus obtained 50 g. of product, 2-(2-thienyl)-3-methyl-4-metathiazanone, M.P. 80.6–83.4° C. (corr.) when recrystallized from n-heptane.

*Anal.*—Calcd. for $C_9H_{11}NOS_2$: N, 6.57; C, 50.67; H, 5.20. Found: N, 6.53; C, 50.46; H, 5.50.

2 - (2 - thienyl) - 3 - methyl - 4 - metathiazanone when administered intraperitoneally as a suspension in an aqueous 1% gum tragacanth solution at a dose level of 400 mg. per kg. prevented death of 2 out of 10 mice which were treated with fatal doses of strychnine hydrochloride given intravenously 30 minutes after administration of the metathiazanone.

Following the above procedure, using 3-thiophenecarboxaldehyde or 2-furaldehyde (furfural) in place of 2-thiophenecarboxaldehyde, there is obtained, respectively, 2 - (3 - thienyl) - 3 - methyl - 4 - metathiazanone or 2-(2-furyl)-3-methyl-4-metathiazanone.

Example 92

*2 - (2 - thienyl) - 3 - methyl - 4 - metathiazanone - 1-dioxide.*—This compound was prepared following the procedure given above in Example 44 using 56.4 g. of potassium permanganate, 500 cc. of water, 21.6 g. of 2-(2-thienyl)-3-methyl-4-metathiazanone and 175 cc. of glacial acetic acid. There was thus obtained 2.2 g. of product, 2 - (2 - thienyl) - 3 - methyl - 4 - metathiazanone-1-dioxide, M.P. 132–137° C. when recrystallized from ethyl alcohol.

*Anal.*—Calcd. for $C_9H_{11}NO_3S_2$: N, 5.75. Found: N, 5.62.

Following the above procedure using 2-(3-thienyl)-3-methyl-4-metathiazanone or 2-(2-furyl)-3-methyl-4-metathiazanone in place of 2-(2-thienyl)-3-methyl-4-metathiazanone, there is obtained, respectively, 2-(3-thienyl)-3-methyl - 4 - metathiazanone - 1 - dioxide or 2 - (2 - furyl)-3-methyl-4-metathiazanone-1-dioxide.

Example 93

*2 - (3 - pyridyl) - 3 - methyl - 4 - metathiazanone.*—This compound was prepared following the procedure given above in Example 1 using 43.2 g. of 3-pyridinecarboxaldehyde, 42.5 g. of beta-mercaptopropionic acid, 14 g. of methylamine, 200 cc. of benzene and a reflux period of forty-eight hours. After the reaction mixture had been washed with ammonium hydroxide solution, there separated 53 g. of product, 2-(3-pyridyl)-3-methyl-4-metathiazanone, M.P. 165.2–168.8° C. (corr.).

*Anal.*—Calcd. for $C_{10}H_{12}N_2OS$: N, 13.45; C, 57.65; H, 5.81. Found: N, 13.43; C, 57.43; H, 6.35.

Following the above procedure using 2-pyridinecarboxaldehyde or 4-pyridinecarboxaldehyde in place of 3-pyridinecarboxaldehyde, there is obtained, respectively, 2 - (2 - pyridyl) - 3 - methyl - 4 - metathiazanone or 2-(4-pyridyl)-3-methyl-4-metathiazanone.

Example 94

*2 - (3 - pyridyl) - 3 - methyl - 4 - metathiazanone - 1-dioxide.*—This compound was prepared following the procedure given above in Example 44 using 36.7 g. of potassium permanganate, 300 cc. of water, 28.3 g. of 2-(3-pyridyl)-3-methyl-4-metathiazanone and 230 cc. of glacial acetic acid. After removal of the manganese dioxide with the sodium bisulfite solution, the reaction mixture was basified to a pH of 6 and the resulting solution was extracted with chloroform. The solvent was then removed by distilling in vacuo and the residue was triturated with n-hexane to give 12.5 g. of solid which was recrystallized from ethyl alcohol to yield 9 g. of product, 2 - (3 - pyridyl) - 3 - methyl - 4 - metathiazanone-1-dioxide, M.P. 163.2–171.8° C. (corr.).

*Anal.*—Calcd. for $C_{10}H_{12}N_2O_3S$: C, 49.98; H, 5.04; N, 11.66. Found: C, 50.30; H, 4.67; N, 11.46.

Following the above procedure using 2-(4-pyridyl)-3-methyl-4-metathiazanone in place of 2-(3-pyridyl)-3-methyl-4-metathiazanone, there is obtained 2-(4-pyridyl)-3-methyl-4-metathiazanone-1-dioxide.

Example 95

*2 - (lower-aromatic)-3-hydrocarbyl-4-metathiazanone-1-oxides.*—The preparation of these compounds is illustrated by the following preparation of 2-(4-chlorophenyl)-3-ethyl-4-metathiazanone-1-oxide:

Ten grams of 2 - (4 - chlorophenyl) - 3 - ethyl-4-metathiazanone were dissolved in 50 cc. of benzene; and 8.2 g. of 40% peracetic acid (40% solution of peracetic acid in acetic acid) was dissolved in 50 cc. of ethyl acetate. The solutions were cooled separately in an ice bath to about 5° C.; and the peracetic acid solution was then added all at once with swirling to the solution of the metathiazanone. The temperature rose rapidly to about 28° C. The solution was swirled in an ice bath for a few minutes during which time the temperature receded to about 7° C. At the end of this period, the solution was transferred to a separatory funnel; washed once with dilute aqueous sodium bisulfite solution and twice with water; dried over anhydrous sodium sulfate; and the solvent removed by distilling in vacuo to yield 10.5 g. of a yellow oily material. The oil solidified when triturated with n-hexane; and the solid was recrystallized from isopropyl alcohol to give 6.9 g. of the product, 2-(4-chlorophenyl)-3-ethyl-4-metathiazanone-1-oxide, M.P. 124.8–126.2° C. (corr.).

*Anal.*—Calcd. for $C_{12}H_{14}ClNO_2S$: Cl, 13.05; N, 5.15. Found: Cl, 13.10; N, 5.11.

The above preparation can be carried out using other per-organic acids, e.g., perbenzoic acid, in place of peracetic acid.

When administered intraperitoneally as a suspension in an aqueous 1% gum tragacanth solution, the median effective dose ($PD_{50}$) of 2-(4-chlorophenyl)-3-ethyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 94±16 mg. per kg.; this is an illustration of the central nervous system depressant activity of this compound. The intraperitoneal median effective dose ($PD_{50}$) of 2-(4-chlorophenyl)-3-ethyl-4-metathiazanone-1-oxide necessary to protect mice from the hind limb extensor component of maximal electroshock seizures was found to be 88±12 mg. per kg. using essentially the method of Swinyard et al.; this procedure demonstrates anticonvulsant properties of this compound. The intraperitoneal median effective dose ($PD_{50}$) of 2-(4-chlorophenyl)-3-ethyl-4-metathiazanone-1-oxide necessary to protect mice from convulsant seizures induced by metrazol was found to be 68±11 mg. per kg.; this procedure also demonstrates anticonvulsant properties of this compound. 2-(4-chlorophenyl)-3-ethyl-4-metathiazanone-1-oxide was found to have an approximate acute intraperitoneal toxicity ($ALD_{50}$) and an approximate acute oral toxicity ($ALD_{50}$) in mice of 625 mg. per kg. and 1250 mg. per kg., respectively.

Other representative 2 - (lower-aromatic) - 3 - hydrocarbyl-4-metathiazanone-1-oxides that can be prepared according to the foregoing procedure used for the preparation of 2-(4-chlorophenyl)-3-ethyl-4-metathiazanone-1-oxide using the appropriate corresponding 2-(lower-aromatic)-3-hydrocarbyl-4-metathiazanone are the following compounds of Examples 96–121.

*Example 96*

2-(2-chlorophenyl)-3-isobutyl - 4 - metathiazanone-1-oxide is obtained following the procedure described in Example 95 using 2 - (2 - chlorophenyl) - 3 - isobutyl-4-metathiazanone.

*Example 97*

2-(3,4-dibromophenyl) - 3 - n-hexyl-5,5,6-trimethyl-4-metathiazanone-1-oxide is obtained following the procedure described in Example 95 using 2-(3,4-dibromophenyl)-3-n-hexyl-5,5,6-trimethyl-4-metathiazanone.

*Example 98*

2-(3,4-dichlorophenyl)-3-methyl-5-ethyl - 6 - isopropyl-4-metathiazanone-1-oxide is obtained following the procedure described in Example 95, using 2-(3,4-dichlorophenyl)-3-methyl-5-ethyl - 6 - isopropyl - 4 - metathiazanone.

*Example 99*

2-(4-iodophenyl)-3-methyl-5-n-propyl - 6 - ethyl - 4 - metathiazanone-1-oxide is obtained following the procedure described in Example 95 using 2-(4-iodophenyl)-3-methyl-5-n-propyl-6-ethyl-4-metathiazanone.

*Example 100*

2-(4-fluorophenyl)-3-methyl - 4 - metathiazanone-1-oxide is obtained following the procedure described in Example 95 using 2-(4-fluorophenyl)-3-methyl-4-metathiazanone.

*Example 101*

2-(2,4,6-trichlorophenyl)-3-cyclohexyl - 5,5 - dimethyl-4-metathiazanone-1-oxide is obtained following the procedure described in Example 95 using 2-(2,4,6-trichlorophenyl)-3-cyclohexyl-5,5-dimethyl - 4 - metathiazanone.

*Example 102*

2-(4-n-butoxyphenyl)-3-cyclopropylmethyl - 4 - metathiazanone-1-oxide is obtained following the procedure described in Example 95 using 2-(4-n-butoxyphenyl)-3-cyclopropylmethyl-4-metathiazanone.

*Example 103*

2-(3,4,5-trimethylphenyl)-3-allyl - 4 - metathiazanone-1-oxide is obtained following the procedure described in Example 95 using 2-(3,4,5-trimethylphenyl)-3-allyl-4-metathiazanone.

*Example 104*

2-(3,4,5-trimethoxyphenyl)-3-methyl - 4 - metathiazanone-1-oxide is obtained following the procedure described in Example 95 using 2-(3,4,5-trimethoxyphenyl)-3-methyl-4-metathiazanone.

*Example 105*

2-(4-methylphenyl)-3,5,5,6-tetramethyl - 4 - metathiazanone-1-oxide is obtained following the procedure described in Example 95 using 2-(4-methylphenyl)-3,5,5,6-tetramethyl-4-metathiazanone.

*Example 106*

2-(2-chloro-4-ethoxyphenyl)-3-methyl - 4 - metathiazanone-1-oxide is obtained following the procedure described in Example 95 using 2-(2-chloro-4-ethoxyphenyl)-3-methyl-4-metathiazanone.

*Example 107*

2-(3-ethyl-4-isopropylphenyl)-3,5-diethyl - 4 - metathiazanone-1-oxide is obtained following the procedure described in Example 95 using 2-(3-ethyl-4-isopropylphenyl)-3,5-diethyl-4-metathiazanone.

*Example 108*

2-(4-n-hexylphenyl)-3,5-diisopropyl - 4 - metathiazanone-1-oxide is obtained following the procedure described in Example 95 using 2-(4-n-hexylphenyl)-3,5-diisopropyl-4-metathiazanone.

*Example 109*

2 - (2-naphthyl)-3-methyl-4-metathiazanone-1-oxide is obtained following the procedure described in Example 95 using 2-(2-naphthyl)-3-methyl-4-metathiazanone.

*Example 110*

2-(1-biphenylyl)-3-methyl-4-metathiazanone-1-oxide is obtained following the procedure described in Example 95 using 2-(1-biphenylyl)-3-methyl-4-metathiazanone.

*Example 111*

2 - (4 - chlorophenyl) - 3-n-propyl-4-metathiazanone-1-oxide is obtained following the procedure described in Example 95 using 2-(4-chlorophenyl)-3-n-propyl-4-metathiazanone.

*Example 112*

2 - (4 - methoxyphenyl) - 3-methyl-4-metathiazanone-1-oxide is obtained following the procedure described in Example 95 using 2-(4-methoxyphenyl)-3-methyl-4-metathiazanone.

*Example 113*

2 - phenyl - 3 - methyl - 4 - metathiazanone-1-oxide is obtained following the procedure described in Example 95 using 2-phenyl-3-methyl-4-metathiazanone.

Example 114

2 - phenyl - 3 - benzyl - 4 - metathiazanone-1-oxide is obtained following the procedure described in Example 95 using 2-phenyl-3-benzyl-4-metathiazanone.

Example 115

2-(3-chlorophenyl)-3-methyl-4-metathiazanone-1-oxide is obtained following the procedure described in Example 95 using 2-(3-chlorophenyl)-3-methyl-4-metathiazanone.

Example 116

2 - (2 - thienyl) - 3-methyl-4-metathiazanone-1-oxide is obtained following the procedure described in Example 95 using 2-(2-thienyl)-3-methyl-4-metathiazanone.

Example 117

2 - (3 - thienyl) - 3-methyl-4-metathiazanone-1-oxide is obtained following the procedure described in Example 95 using 2-(3-thienyl)-3-methyl-4-metathiazanone.

Example 118

2 - (2 - furyl) - 3-methyl-4-metathiazanone-1-oxide is obtained following the procedure described in Example 95 using 2-(2-furyl)-3-methyl-4-metathiazanone.

Example 119

2 - (3 - pyridyl) - 3-methyl-4-metathiazanone-1-oxide is obtained following the procedure described in Example 95 using 2-(3-pyridyl)-3-methyl-4-metathiazanone.

Example 120

2 - (2 - pyridyl) - 3-methyl-4-metathiazanone-1-oxide is obtained following the procedure described in Example 95 using 2-(2-pyridyl)-3-methyl-4-metathiazanone.

Example 121

2 - (4 - pyridyl) - 3 - methyl - 4 - metathiazanone-1-oxide is obtained following the procedure described in Example 95 using 2 - (4-pyridyl)-3-methyl-4-metathiazanone.

Example 122

2 - (3,4 - dichlorophenyl)-3-ethyl-4-metathiazanone-1-oxide.—This compound was prepared following the procedure described in Example 95 using 10.0 g. of 2-(3,4-dichlorophenyl)-3-ethyl-4-metathiazanone and 7.42 g. of 40% peracetic acid. There was thus obtained 5.4 g. of 2 - (3,4 - dichlorophenyl) - 3 - ethyl - 4 - metathiazanone-1-oxide, M.P. 161.4–164.2° C. (corr.) when recrystallized from ethanol.

Anal.—Calcd. for $C_{12}H_{13}Cl_2NO_2S$: C, 23.24; N, 4.59. Found: Cl, 23.00; N, 4.52.

When administered intraperitoneally as a suspension in an aqueous 1% gum tragacanth solution, the median effective dose ($PD_{50}$) of 2-(3,4-dichlorophenyl)-3-ethyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 26 ± 11 mg. per kg. The intraperitoneal median effective dose ($PD_{50}$) of 2-(3,4-dichlorophenyl)-3-ethyl-4-metathiazanone-1-oxide necessary to protect mice from the hind limb extensor component of maximal electroshock seizures was found to be 38.5 ± 8.4 mg. per kg. using essentially the method of Swinyard et al. The intraperitoneal median effective dose ($PD_{50}$) of 2-(3,4-dichlorophenyl)-3-ethyl-4-metathiazanone-1-oxide necessary to protect mice from convulsant seizures induced by metrazol was found to be 61 ± 13 mg. per kg. 2-(3,4-dichlorophenyl) - 3 - ethyl - 4 - metathiazanone-1-oxide was found to have an approximate acute intraperitoneal toxicity ($ALD_{50}$) in mice of 625 mg. per kg. and to have an acute oral toxicity ($LD_{50}$) in mice of 740 ± 180 mg. per kg.

The intermediate 2 - (3,4-dichlorophenyl)-3-ethyl-4-metathiazanone was prepared as follows: A mixture containing 25 g. of 3,4-dichlorobenzal-N-ethylimine (B.P. 85° C. at 0.6 mm., $n_D^{25}$ 1.5732, prepared in 60% yield by refluxing for three and one-half hours a solution of 52.5 g. of 3,4-dichlorobenzaldehyde and 13.5 g. of ethylamine in 200 cc. of benzene), 14.3 g. of beta-mercaptopropionic acid and 100 cc. of benzene was refluxed with a continuous separator connected to the reaction vessel for removal of water formed by the reaction. After ninety-six hours, 2 cc. of water had been collected. The reaction mixture was cooled and washed with dilute ammonium hydroxide; and the resulting benzene solution was distilled in vacuo to remove the benzene. The viscous oily residue was distilled in vacuo to give 20.0 g. (56% yield) of 2-(3,4-dichlorophenyl) - 3 - ethyl - 4 - metathiazanone, B.P. 165–170° C. at 0.01 mm.

Example 123

2 - (3,4 - dichlorophenyl)-3-methyl-4-metathiazanone-1-oxide.—This compound was prepared following the procedure described in Example 95 using 10.0 g. of 2-(3,4-dichlorophenyl)-3-methyl-4-metathiazanone and 7.6 g. of 40% peracetic acid. There was thus obtained 6.3 g. of the product, 2-(3,4-dichlorophenyl)-3-methyl-4-metathiazanone-1-oxide, M.P. 172.4–177.8° C. (corr.) when recrystallized twice from ethanol.

Anal.—Calcd. for $C_{11}H_{11}Cl_2NO_2S$: Cl, 24.27; O, 10.95. Found: Cl, 24.28; O, 11.08.

When administered intraperitoneally as a suspension in an aqueous 1% gum tragacanth solution, the median effective dose ($PD_{50}$) of 2-(3,4-dichlorophenyl)-3-methyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 104 ± 19 mg. per kg. The intraperitoneal median effective dose ($PD_{50}$) of 2-(3,4-dichlorophenyl)-3-methyl-4-metathiazanone-1-oxide necessary to protect mice from the hind limb extensor component of maximal electroshock seizures was found to be 60.5 ± 11 mg. per kg. using essentially the method of Swinyard et al. The intraperitoneal median effective dose ($PD_{50}$) of 2-(3,4-dichlorophenyl)-3-methyl-4-metathiazanone-1-oxide necessary to protect mice from convulsant seizures induced by metrazol was found to be 116 ± 16 mg. per kg. 2-(3,4-dichlorophenyl)-3-methyl-4-metathiazanone-1-oxide was found to have an approximate acute intraperitoneal toxicity ($ALD_{50}$) and an approximate acute oral toxicity ($ALD_{50}$) in mice of 625 mg. per kg. and 1500 mg. per kg., respectively.

Example 124

2 - (2,4 - dichlorophenyl) - 3-ethyl-4-metathiazanone-1-oxide.—This compound was prepared following the procedure described in Example 95 using 11.6 g. of 2-(2,4-dichlorophenyl)-3-ethyl-4-metathiazanone and 8.4 g. of 40% peracetic acid. There was thus obtained 6.2 g. of the product, 2-(2,4-dichlorophenyl)-3-ethyl-4-metathiazanone-1-oxide, M.P. 147.2–149.6° C. (corr.) when recrystallized three times from isopropyl alcohol.

Anal.—Calcd. for $C_{12}H_{13}Cl_2NO_2S$: Cl, 23.16; N, 4.58. Found: Cl, 22.91; N, 4.54.

The intraperitoneal median effective dose ($PD_{50}$) of 2 - (2,4 - dichlorophenyl) - 3 - ethyl - 4 - metathiazanone-1-oxide necessary to protect mice from the hind limb extensor component of maximal electroshock seizures was found to be 71±6.2 mg. per kg. using essentially the method of Swinyard et al. 2-(2,4-dichlorophenyl)-3-ethyl-4-metathiazanone-1-oxide was found to have an approximate acute intraperitoneal toxicity ($ALD_{50}$) and an approximate acute oral toxicity ($ALD_{50}$) in mice of 375 mg. per kg. and 3000 mg. per kg., respectively.

The intermediate 2 - (2,4 - dichlorophenyl) - 3 - ethyl-4-metathiazanone was prepared following the procedure described in Example 122 for the preparation of 2-(3,4-dichlorophenyl)-3-ethyl-4-metathiazanone using 20.2 g.

of 2,4-dichlorobenzal-N-ethylimine (B.P. 68–74° C. at 0.4–0.5 mm., $n_D^{25}$ 1.5696, prepared in 72% yield by refluxing for six hours a solution of 52.5 g. of 2,4-dichlorobenzaldehyde and 13.5 g. of ethylamine in 200 cc. of benzene), 11.5 g. of beta-mercaptopropionic acid, 100 cc. of benzene and a reflux period of seventy-two hours. After removal of the benzene solvent, the residue was triturated with n-hexane and the resulting crystals were recrystallized from n-hexane to yield 11.6 g. of 2-(2,4-dichlorophenyl) - 3 - ethyl - 4 - metathiazanone, M.P. 67–70° C.

Example 125

2 - (4 - chlorophenyl) - 3 - methyl - 4 - metathiazanone-1-oxide.—This compound was prepared following the procedure described in Example 95 using 5.0 g. of 2-(4-chlorophenyl)-3-methyl-4-metathiazanone and 4.4 g. of 40% peracetic acid. There was thus obtained 1.67 g. of 2 - (4 - chlorophenyl) - 3 - methyl - 4 - metathiazanone-1-oxide, M.P. 143.0–146.6° C. (corr.) when recrystallized once from n-hexane and once from benzene.

Anal.—Calcd. for $C_{11}H_{12}ClNO_2S$: N, 5.44; Cl, 13.76. Found: N, 5.48; Cl, 13.94.

When administered intraperitoneally as a suspension in an aqueous 1% gum tragacanth solution, the median effective dose ($PD_{50}$) of 2-(4-chlorophenyl)-3-methyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 178±26 mg. per kg. The intraperitoneal median effective dose ($PD_{50}$) of 2-(4-chlorophenyl)-3-methyl-4-metathiazanone-1-oxide necessary to protect mice from convulsant seizures induced by metrazol was found to be 185±31 mg. per kg. 2-(4-chlorophenyl)-3-methyl-4-metathiazanone-1-oxide was found to have an approximate acute intraperitoneal toxicity ($ALD_{50}$) and an approximate acute oral toxicity ($ALD_{50}$) in mice of 750 mg. per kg. and 1250 mg. per kg., respectively.

Example 126

2 - (2 - chlorophenyl) - 3 - methyl - 4 - metathiazanone-1-oxide.—This compound was prepared following the procedure described in Example 95 using 12.5 g. of 2-(2-chlorophenyl)-3-methyl-4-metathiazanone and 10.8 g. of 40% peracetic acid. There was thus obtained 5.0 g. of 2-(2-chlorophenyl)-3-methyl-4-metathiazanone-1-oxide, M.P. 116.8–120.6° C. (corr.) when recrystallized from acetone.

Anal.—Calcd. for $C_{11}H_{12}ClNO_2S$: Cl, 13.76; O, 12.42. Found: Cl, 13.65; O, 12.65.

When administered intraperitoneally as a suspension in an aqueous 1% gum tragacanth solution, the median effective dose ($PD_{50}$) of 2-(2-chlorophenyl)-3-methyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 108±15 mg. per kg. The intraperitoneal median effective dose ($PD_{50}$) of 2-(2-chlorophenyl)-3-methyl-4-metathiazanone-1-oxide necessary to protect mice from the hind limb extensor component of maximal electroshock seizures was found to be 97±19.4 mg. per kg. using essentially the method of Swinyard et al. The intraperitoneal median effective dose ($PD_{50}$) of 2-(2-chlorophenyl)-3-methyl-4-metathiazanone-1-oxide necessary to protect mice from convulsant seizures induced by metrazol was found to be 188±31 mg. per kg. 2-(2-chlorophenyl)-3-methyl-4-metathiazanone-1-oxide was found to have an approximate acute intraperitoneal toxicity ($ALD_{50}$) and an approximate acute oral toxicity ($ALD_{50}$) in mice of 750 mg. per kg. and 1500 mg. per kg., respectively.

Example 127

2 - (2,4 - dichlorophenyl) - 3 - methyl - 4 - metathiazanone-1-oxide.—This compound was prepared following the procedure described in Example 95 using 13.7 g. of 2 - (2,4 - dichlorophenyl) - 3 - methyl - 4 - metathiazanone and 10.5 g. of 40% peracetic acid. There was thus obtained 10.6 g. of 2-(2,4-dichlorophenyl)-3-methyl-4-metathiazanone-1-oxide, M.P. 146.0–149.4° C. (corr.) when recrystallized from isopropyl alcohol.

Anal.—Calcd. for $C_{11}H_{11}Cl_2NO_2S$: Cl, 24.26; O, 10.95. Found: Cl, 23.86; O, 11.05.

When administered intraperitoneally as a suspension in an aqueous 1% gum tragacanth solution, the median effective dose ($PD_{50}$) of 2-(2,4-dichlorophenyl)-3-methyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 119±17 mg. per kg. The intraperitoneal median effective dose ($PD_{50}$) of 2-(2,4-dichlorophenyl)-3-methyl-4-metathiazanone-1-oxide necessary to protect mice from the hind limb extensor component of maximal electroshock seizures was found to be 53.5±8.6 mg. per kg. using essentially the method of Swinyard et al. The intraperitoneal median effective dose ($PD_{50}$) of 2-(2,4-dichlorophenyl)-3-methyl-4-metathiazanone-1-oxide necessary to protect mice from convulsant seizures induced by metrazol was found to be 124±17 mg. per kg. 2-(2,4-dichlorophenyl)-3-methyl-4-metathiazanone-1-oxide was found to have an approximate acute intraperitoneal toxicity ($ALD_{50}$) and an approximate acute oral toxicity ($ALD_{50}$) in mice of 375 mg. per kg. and 1250 mg. per kg., respectively.

Example 128

2 - (4 - isopropylphenyl) - 3 - methyl - 4 - metathiazanone-1-oxide.—This compound was prepared following the procedure described in Example 95 using 13.5 g. of 2 - (4 - isopropylphenyl) - 3 - methyl - 4 - metathiazanone and 11.4 g. of 40% peracetic acid. There was thus obtained 8.3 g. of 2-(4-isopropylphenyl)-3-methyl-4-metathiazanone-1-oxide, M.P. 123.6–126.8° C. (corr.) when recrystallized once from n-heptane and once from benzene-n-heptane.

Anal.—Calcd. for $C_{14}H_{19}NO_2S$: S, 12.08; N, 5.28. Found: S, 12.32; N, 5.38.

When administered intraperitoneally as a suspension in an aqueous 1% gum tragacanth solution, the median effective dose ($PD_{50}$) of 2-(4-isopropylphenyl)-3-methyl-4-metathiazanone-1-oxide necessary to prevent death of mice which were treated with lethal doses ($LD_{100}$) of strychnine hydrochloride given intravenously sixty minutes after administration of the metathiazanone-1-oxide was found to be 101±18 mg. per kg. The intraperitoneal median effective dose ($PD_{50}$) of 2-(4-isopropylphenyl)-3-methyl-4-metathiazanone-1-oxide necessary to protect mice from the hind limb extensor component of maximal electroshock seizures was found to be 344±50.8 mg. per kg. using essentially the method of Swinyard et al. 2 - (4 - isopropylphenyl) - 3 - methyl - 4 - metathiazanone-1-oxide was found to have an approximate acute intraperitoneal toxicity ($ALD_{50}$) and an approximate acute oral toxicity ($ALD_{50}$) in mice of 750 mg. per kg. and 3000 mg. per kg., respectively.

Example 129

2-(4-isopropylphenyl) - 3 - ethyl - 4 - metathiazanone-1-oxide.—This compound was prepared following the procedure described in Example 95 using 8.0 g. of 2-(4-isopropylphenyl)-3-ethyl-4-metathiazanone and 6.27 g. of 40% peracetic acid. There was thus obtained 5.8 g. of 2 - (4-isopropylphenyl)-3-ethyl-4-metathiazanone-1-oxide, M.P. 105.8–107.4° C. (corr.) when recrystallized twice from benzene-n-heptane.

Anal.—Calcd. for $C_{15}H_{21}NO_2S$: S, 11.48; N, 5.02. Found: S, 11.43; N, 4.97.

When administered intraperitoneally as a suspension in an aqueous 1% gum tragacanth solution, the median effective dose ($PD_{50}$) of 2-(4-isopropylphenyl)-3-ethyl-4-metathiazanone-1-oxide necessary to prevent death of mice which were treated with lethal does ($LD_{100}$) of strychnine hydrochloride given intravenously sixty minutes after administration of the metathiazanone-1-oxide was found to be 258±60 mg. per kg. The intraperitoneal median effective dose ($PD_{50}$) of 2-(4-isopropylphenyl)-3-ethyl-4-metathiazanone-1-oxide necessary to protect mice from the hind limb extensor component of maximal electroshock seizures was found to be 131±19.8 mg. per kg. using essentially the method of Swinyard et al. 2-(4-isopropylphenyl)-3-ethyl - 4 - metathiazanone-1-oxide was found to have an approximate acute intraperitoneal toxicity ($ALD_{50}$) and an approximate acute oral toxicity ($ALD_{50}$) in mice of 375 mg. per kg. and 1750 mg. per kg., respectively.

The intermediate 2-(4-isopropylphenyl)-3-ethyl-4-metathiazanone was prepared following the procedure described in Example 122 for the preparation of 2-(3,4-dichlorophenyl)-3-ethyl-4-metathiazanone using 17.5 g. of 4-isopropylbenzal-N-ethylimine, 11.5 g. of beta-mercaptopropionic acid, 100 cc. of benzene and a reflux period of seventy-two hours. There was thus obtained 8.4 g. of 2-(4-isopropylphenyl)-3-ethyl-4-metathiazanone, B.P. 156–160° C. at 0.4 mm.; $n_D^{25°}$, 1.5622.

*Example 130*

2-(2 - chlorophenyl) - 3 - ethyl - 4 - metathiazanone-1-oxide.—This compound was prepared following the procedure described in Example 95 using 11.2 g. of 2-(2-chlorophenyl)-3-ethyl-4-metathiazanone and 9.1 g. of 40% peracetic acid. There was thus obtained 6.8 g. of 2 - (2-chlorophenyl)-3-ethyl-4-metathiazanone - 1 - oxide, M.P. 160.4–161.6° C. (corr.) when recrystallized from ethanol.

*Anal.*—Calcd. for $C_{12}H_{14}ClNO_2S$: Cl, 13.05; N, 5.15. Found: Cl, 13.25; N, 5.11.

The intraperitoneal median effective dose ($PD_{50}$) of 2-(2-chlorophenyl)-3-ethyl-4-metathiazanone-1-oxide necessary to protect mice from the hind limb extensor component of maximal electroshock seizures was found to be 50±8.1 mg. per kg. using essentially the method of Swinyard et al. 2-(2-chlorophenyl)-3-ethyl-4-metathiazanone-1-oxide was found to have an approximate acute intraperitoneal toxicity ($ALD_{50}$) and an approximate acute oral toxicity ($ALD_{50}$) in mice of 310 mg. per kg. and 1500 mg. per kg., respectively.

The preparation of the intermediate 2-(2-chlorophenyl)-3-ethyl-4-metathiazanone was prepared following the procedure described in Example 122 for the preparation of 2-(3,4-dichlorophenyl)-3-ethyl - 4 - metathiazanone using 16.8 g. of 2-chlorobenzal-N-ethylimine, 11.5 g. of beta-mercaptopropionic acid, 100 cc. of benzene and a reflux period of forty-eight hours. There was thus obtained 12.1 g. of 2-(2-chlorophenyl)-3-ethyl-4-metathiazanone, B.P. 156–158° C. at 0.3 mm.; $n_D^{25°}$, 1.5933.

*Example 131*

2 - (3,4-dimethoxyphenyl)-3-methyl-4-metathiazanone-1-oxide.—This compound was prepared following the procedure described in Example 95 using 10.0 g. of 2-(3,4-dimethoxyphenyl)-3-methyl-4-metathiazanone and 7.5 g. of 40% peracetic acid. There was thus obtained 3.3 g. of 2-(3,4-dimethoxyphenyl)-3-methyl-4-metathiazanone-1-oxide, M.P. 163.2–165.8° C. (corr.) when recrystallized twice from isopropyl alcohol and once from benzene.

*Anal.*—Calcd. for $C_{13}H_{17}NO_4S$: S, 11.31; N, 4.94. Found: S, 11.10; N, 4.87.

2 - (3,4-dimethoxyphenyl)-3-methyl-4-metathiazanone-1-oxide when administered intraperitoneally as a suspension in an aqueous 1% gum tragacanth solution at a dose level of 400 mg. per kg. prevented death of three out of ten mice which were treated with lethal doses ($LD_{100}$) of strychnine hydrochloride given intravenously sixty minutes after administration of the metathiazanone-1-oxide.

The intermediate 2-(3,4-dimethoxyphenyl)-3-methyl-4-metathiazanone was prepared following the procedure described in Example 122 for the preparation of 2-(3,4-dichlorophenyl)-3-ethyl-4-metathiazanone using 35.8 g. of 3,4-dimethoxybenzal-N-methylimine, 23.1 g. of beta-mercaptopropionic acid, 200 cc. of benzene and a reflux period of seventy hours. After removal of the benzene, the yellow oily residue solidified and was recrystallized twice from n-heptane to yield 2-(3,4-dimethoxyphenyl)-3-methyl-4-metathiazanone, M.P. 90–92° C.

*Example 132*

2 - (lower-aromatic)-4-metathiazanone-1-oxides.—The preparation of these compounds is illustrated by the preparation of 2-(4-chlorophenyl)-4-metathiazanone-1-oxide using 2-(4-chlorophenyl)-4-metathiazanone and following the procedure described above in Example 95. The product obtained is 2-(4-chlorophenyl)-4-metathiazanone-1-oxide.

Other 2 - (lower-aromatic)-4-metathiazanone-1-oxides that can be prepared according to the foregoing procedure used for the preparation of 2-(4-chlorophenyl)-4-metathiazanone-1-oxide using the corresponding 2-(lower-aromatic)-4-metathiazanones are presented in Examples 133–151.

*Example 133*

2-phenyl-4-metathiazanone-1-oxide is obtained following the procedure described in Example 95 using 2-phenyl-4-metathiazanone.

*Example 134*

2-(4-methoxyphenyl)-4-metathiazanone-1-oxide is obtained following the procedure described in Example 95 using 2-(4-methoxyphenyl)-4-metathiazanone.

*Example 135*

2-(4-bromophenyl)-4-metathiazanone-1-oxide is obtained following the procedure described in Example 95 using 2-(4-bromophenyl)-4-metathiazanone.

*Example 136*

2-(3,4-dichlorophenyl)-4-metathiazanone-1-oxide is obtained following the procedure described in Example 95 using 2-(3,4-dichlorophenyl)-4-metathiazanone.

*Example 137*

2-(2,4-dichlorophenyl)-4-metathiazanone-1-oxide is obtained following the procedure described in Example 95 using 2-(2,4-dichlorophenyl)-4-metathiazanone.

*Example 138*

2 - (3-chlorophenyl)-5-methyl-4-metathiazanone-1-oxide is obtained following the procedure described in Example 95 using 2-(3-chlorophenyl)-5-methyl-4-metathiazanone.

*Example 139*

2 - (3,4-dibromophenyl)-6-methyl-4-metathiazanone-1-oxide is obtained following the procedure described in Example 95 using 2-(3,4-dibromophenyl)-6-methyl-4-metathiazanone.

*Example 140*

2-(3,4-dichlorophenyl)-5-methyl-6-isopropyl - 4 - metathiazanone-1-oxide is obtained following the procedure described in Example 95 using 2-(3,4-dichlorophenyl)-5-methyl-6-isopropyl-4-metathiazanone.

*Example 141*

2-(4-iodophenyl)-4-metathiazanone-1-oxide is obtained following the procedure described in Example 95 using 2-(4-iodophenyl)4-metathiazanone.

*Example 142*

2-(4-fluorophenyl)4-metathiazanone-1-oxide is obtained

Example 143

2-(2,4,6-trichlorophenyl)-5,6-dimethyl-4 - metathiazan-one-1-oxide is obtained following the procedure described in Example 95 using 2-(2,4,6 - trichlorophenyl) - 5,6-dimethyl-4-metathiazanone.

Example 144

2-(4-isobutoxyphenyl) - 5,5,6 - trimethyl - 4 - metathiazanone-1-oxide is obtained following the procedure described in Example 95 using 2-(4-isobutoxyphenyl)-5,5,6-trimethyl-4-metathiazanone.

Example 145

2-(3,4,5 - trimethylphenyl) - 5,5,6 - trimethyl-4-metathiazanone-1-oxide is obtained following the procedure described in Example 95 using 2-(3,4,5-trimethylphenyl)-5,5,6-trimethyl-4-metathiazanone.

Example 146

2-(4-ethylphenyl) - 5,5 - diethyl-4-metathiazanone - 1-oxide is obtained following the procedure described in Example 95 using 2 - (4-ethylphenyl)-5,5-diethyl-4-metathiazanone.

Example 147

2-(3-ethyl-4-isopropoxyphenyl)-5-isopropyl - 4 - metathiazanone-1-oxide is obtained following the procedure described in Example 95 using 2-(3-ethyl-4-isopropoxyphenyl)-5-isopropyl-4-metathiazanone.

Example 148

2-(ethoxy-4-chlorophenyl)-4-metathiazanone - 1 - oxide is obtained following the procedure described in Example 95 using 2-(3-ethoxy-4-chlorophenyl)-4-metathiazanone.

Example 149

2-(3-n-hexylphenyl)-5-methyl-4-metathiazanone-1 - oxide is obtained following the procedure described in Example 95 using 2-(3-n-hexylphenyl)-5-methyl-4-metathiazanone.

Example 150

2-(1-naphthyl) - 4 - metathiazanone - 1 - oxide is obtained following the procedure described in Example 95 using 2-(1-naphthyl)-4-metathiazanone.

Example 151

2-(2-biphenylyl)-4-metathiazanone - 1 - oxide is obtained following the procedure described in Example 95 using 2-(2-biphenylyl)-4-metathiazanone.

Example 152

2-(4-methylphenyl)-3-methyl - 4 - metathiazanone was prepared following the procedure described in Example 122 for the preparation of 2-(3,4-dichlorophenyl)-3-ethyl-4-metathiazanone using 26.6 g. of 4-methylbenzal-N-methylimine, 23.1 g. of beta-mercaptopropionic acid, 200 cc. of benzene and a reflux period of about twenty-four hours. There was thus obtained 31.3 g. of the product, M.P. 86.0–89.8° C. (corr.) when recrystallized from n-hexane.

*Analysis.*—Calcd. for $C_{12}H_{15}NOS$: N, 6.33; S, 14.48. Found: N, 6.33; S, 14.34.

When administered intraperitoneally as a suspension in an aqueous 1% gum tragacanth solution, the median effective dose ($PD_{50}$) of 2-(4-methylphenyl)-3-methyl-4-metathiazanone necessary to prevent death of mice which were treated with lethal doses ($LD_{100}$) of strychnine hydrochloride given intravenously sixty minutes after administration of the metathiazanone was found to be 125±17.4 mg. per kg.

Example 153

2-(2-methylphenyl)-3-methyl - 4 - metathiazanone was prepared following the procedure described in Example 122 for the preparation of 2-(3,4-dichlorophenyl)-3-methyl-4-metathiazanone using 24.5 g. of 2-methylbenzal-N-methylimine (B.P. 40–50° C. at 0.5 mm., $n_D^{25}$ 1.5337, prepared in 88% yield by refluxing for six and one-half hours a solution of 25 g. of 2-methylbenzaldehyde, 6.5 g. of methylamine and 150 cc. of benzene), 20.0 g. of beta-mercaptopropionic acid, 200 cc. of benzene and a reflux period of sixty-nine hours. There was thus obtained 16.2 g. of the product, M.P. 86.4–89.6° C. (corr.) when recrystallized from n-hexane.

*Analysis.*—Calcd. for $C_{12}H_{15}NOS$: N, 6.33; S, 14.48. Found: N, 6.26; S, 14.55.

A dose of 400 mg. per kg. of 2-(2-methylphenyl)-3-methyl-4-metathiazanone protected 10 out of 10, 9 out of 10, 8 out of 10 and 3 out of 10 mice for 1, 2, 4 and 6 hours, respectively, from the hind limb extensor component of maximal electroshock seizures.

Example 154

2-phenyl-3-(2-phenylethyl)-4-metathiazanone was prepared following the procedure described in Example 1 using 10.6 g. of benzaldehyde, 12.1 g. of 2-phenylethylamine, 11.5 g. of beta-mercaptopropionic acid, 100 cc. of benzene and a reflux period of about twenty-four hours. There was thus obtained about 5 g. of the product, M.P 75.4–83.8° C. (corr.) when recrystallized from n-heptane.

*Analysis.*—Calcd. for $C_{18}H_{19}NOS$: N, 4.71; S, 10.78. Found: N, 4.76; S, 10.93.

A dose of 400 mg. per kg. of 2-phenyl-3-(2-phenylethyl)-4-metathiazanone protected 6 out of 10, 7 out of 10, 7 out of 10 and 5 out of 10 mice for 1, 2, 4 and 6 hours, respectively, from the hind limb extensor component of maximal electroshock seizures. 2-phenyl-3-(2-phenylethyl)-4-metathiazanone was found to have an approximate acute intraperitoneal toxicity ($ALD_{50}$) in mice of 1000 mg. per kg.

Example 155

2-(4 - acetylaminophenyl)-3-methyl-4 - metathiazanone was prepared following the procedure described in Example 1 using 25.4 g. of 4-acetylamino-benzaldehyde, 4.7 g. of methylamine, 15.8 g. of beta-mercaptopropionic acid, 200 cc. of benzene and a reflux period of about twenty-two hours. There was thus obtained about 4.6 g. of the product, M.P. 219.4–224.2° C. (corr.) when recrystallized from isopropyl alcohol.

*Analysis.*—Calcd. for $C_{13}H_{16}N_2O_2S$: N, 10.60; S, 12.13. Found: N, 10.43; S, 11.74.

When administered intraperitoneally as a suspension in an aqueous 1% gum tragacanth solution, the median effective dose ($PD_{50}$) of 2 - (4 - acetylaminophenyl)-3-methyl-4-metathiazanone necessary to prevent death of mice which were treated with lethal doses ($LD_{100}$) of strychnine hydrochloride given intravenously sixty minutes after administration of the metathiazanone was found to be 152±26.8 mg. per kg. A dose of 400 mg. per kg. of 2-(4-acetylaminophenyl)-3-methyl - 4-metathiazanone protected 9 out of 9, 9 out of 9, 7 out of 9 and 7 out of 9 mice for 1, 2, 4 and 6 hours, respectively, from the hind limb extensor component of maximal electroshock seizures. 2-(4 - acetylaminophenyl)-3-methyl-4-metathiazanone was found to have an approximate acute intraperitoneal toxicity ($ALD_{50}$) in mice of 3000 mg. per kg. and to have an approximate acute oral toxicity ($ALD_{50}$) in mice of greater than 4000 mg. per kg.

Example 156

2-(2-pyridyl)-3-methyl-4-metathiazanone - 1 - dioxide was prepared following the procedure described in Example 44 using 17.2 g. of 2-(2-pyridyl)-3-methyl-4-metathiazanone, 140 cc. of glacial acetic acid, 22.2 g. of potassium permanganate and 200 cc. of water. There was thus obtained 7.4 g. of the product, M.P. 144.6–152.4° C. (corr.) when recrystallized from isopropyl alcohol.

*Analysis.*—Calcd. for $C_{10}H_{12}N_2O_3S$: N, 11.66; S, 13.34. Found: N, 11.33; S, 13.35.

Example 157

2 - (3,4 - dichlorophenyl) - 3 - ethyl - 4 - metathiazanone-1-dioxide was prepared following the procedure described in Example 44 using 7.5 g. of 2-(3,4-dichlorophenyl)-3-ethyl-4-metathiazanone, 50 cc. of glacial acetic acid, 7.5 g. of potassium permanganate and 75 cc. of water. There was thus obtained 5.5 g. of the product, M.P. 137.2–139.8° C. (corr.) when recrystallized from isopropyl alcohol.

Anal.—Calcd. for $C_{12}H_{13}Cl_2NO_3S$: Cl, 22.01; S, 9.95. Found: Cl, 22.04; S, 9.99.

The intraperitoneal median effective dose ($PD_{50}$) of 2 - (3,4 - dichlorophenyl) - 3 - ethyl - 4 - metathiazanone-1-dioxide necessary to protect mice from the hind limb extensor component of maximal electroshock seizures was found to be 96±14.7 mg. per kg. 2-(3,4-dichlorophenyl)-3-ethyl-4-metathiazanone-1-dioxide was found to have an acute oral toxicity ($LD_{50}$) in mice of 4100±1180 mg. per kg. after twenty-four hours and 1940±350 mg. per kg. after seven days.

Example 158

2 - (4 - chlorophenyl) - 3 - (2 - phenylethyl) - 4 - metathiazanone-1-dioxide was prepared following the procedure described in Example 44 using 9.2 g. of 2-(4-chlorophenyl)-3-(2-phenylethyl)-4-metathiazanone, 30 cc. of glacial acetic acid, 9.2 g. of potassium permanganate and 92 cc. of water. There was thus obtained 3.2 g. of the product, M.P. 133.2–137.2° C. (corr.) when recrystallized from isopropyl alcohol.

Anal.—Calcd. for $C_{16}H_{18}ClNO_3S$: Cl, 9.74; S, 8.81. Found: Cl, 9.83; S, 8.80.

A dose of 200 mg. per kg. of 2-(4-chlorophenyl)-3-(2-phenylethyl)-4-metathiazanone-1-dioxide protected 7 out of 8, 4 out of 8, 2 out of 8 and 1 out of 8 mice for 1, 2, 4 and 6 hours, respectively, from the hind limb extensor component of maximal electroshock seizures. 2-(4-chlorophenyl) - 3-(2 - phenylethyl) - 4 - metathiazanone - 1-dioxide was found to have an approximate acute intraperitoneal toxicity ($ALD_{50}$) in mice of 1330 mg. per kg.

Example 159

2 - (4 - chlorophenyl) - 3 - benzyl - 4 - metathiazanone-1-dioxide was prepared following the procedure described in Example 44 using 11 g. of 2-(4-chlorophenyl)-3-benzyl-4-metathiazanone, 40 cc. of glacial acetic acid, 11 g. of potassium permanganate and 110 cc. of water. There was thus obtained 2.7 g. of the product, M.P. 180.0–187.4° C. (corr.) when recrystallized from isopropyl alcohol.

Anal.—Calcd. for $C_{17}H_{16}ClNO_3S$: Cl, 10.14; S, 9.16. Found: Cl, 9.94; S, 9.23.

Example 160

2 - (3,4 - dichlorophenyl) - 3 - (2 - phenylethyl) - 4-metathiazanone-1-dioxide was prepared following the procedure described in Example 44 using 7 g. of 2-(3,4-dichlorophenyl)-3-(2-phenylethyl)-4-metathiazanone, 35 cc. of glacial acetic acid, 7 g. of potassium permanganate and 70 cc. of water. There was thus obtained 3.8 g. of the product, M.P. 149.8–151.8° C. (corr.) when recrystallized from isopropyl alcohol.

Anal.—Calcd. for $C_{18}H_{17}Cl_2NO_3S$: Cl, 17.80; S, 8.04. Found: Cl, 17.68; S, 8.11.

Example 161

2 - (4 - methylphenyl) - 3 - methyl - 4 - metathiazanone-1-dioxide was prepared following the procedure described in Example 44 using 10 g. of 2-(4-methylphenyl)-3-methyl-4-metathiazanone, 15 cc. of glacial acetic acid, 10 g. of potassium permanganate and 100 cc. of water. There was thus obtained 8.1 g. of the product, M.P. 131.6–133.0° C. (corr.) when recrystallized from isopropyl alcohol.

Anal.—Calcd. for $C_{12}H_{15}NO_3S$: N, 5.53; S, 12.65. Found: N, 5.51; S, 12.38.

When administered intraperitoneally as a suspension in an aqueous 1% gum tragacanth solution, the median effective dose ($PD_{50}$) of 2-(4-methylphenyl)-3-methyl-4-metathiazanone-1-dioxide necessary to prevent death of mice which were treated with lethal doses ($LD_{100}$) of strychnine hydrochloride given intravenously sixty minutes after administration of the metathiazanone was found to be 105±15.4 mg. per kg.

Example 162

2 - (2 - methylphenyl) - 3 - methyl - 4 - metathiazanone-1-dioxide was prepared following the procedure described in Example 44 using 11 g. of 2-(2-methylphenyl)-3-methyl-4-metathiazanone, 30 cc. of glacial acetic acid, 11 g. of potassium permanganate and 110 cc. of water. There was thus obtained 7.2 g. of the product, M.P. 140.8–146.0° C. (corr.) when recrystallized from isopropyl alcohol.

Anal.—Calcd. for $C_{12}H_{15}NO_3S$: N, 5.53; S, 12.65. Found: N, 5.47; S, 12.34.

A dose of 400 mg. per kg. of 2-(2-methylphenyl)-3-methyl-4-metathiazanone-1-dioxide protected 10 out of 10, 10 out of 10, 6 out of 10 and 1 out of 10 mice for 1, 2, 4 and 6 hours, respectively, from the hind limb extensor component of maximal electroshock seizures.

Example 163

2 - (3,4 - dimethoxyphenyl) - 3 - methyl - 4 - metathiazanone-1-dioxide was prepared following the procedure described in Example 44 using 10 g. of 2-(3,4-dimethoxyphenyl)-3-methyl-4-metathiazanone, 50 cc. of glacial acetic acid, 10 g. of potassium permanganate and 100 cc. of water. There was thus obtained 5.0 g. of the product, M.P. 136.8–140.0° C. (corr.) when recrystallized from isopropyl alcohol.

Anal.—Calcd. for $C_{13}H_{17}NO_5S$: C, 52.16; H, 5.69; S, 10.71. Found: C, 52.43; H, 5.26; S, 10.64.

A dose of 400 mg. per kg. of 2-(3,4-dimethoxyphenyl)-3-methyl-4-metathiazanone-1-dioxide protected 4 out of 10, 1 out of 10 and 0 out of 10 mice for 1, 2 and 4 hours, respectively, from the hind limb extensor component of maximal electroshock siezures.

Example 164

2 - (3,4 - dichlorophenyl) - 3 - n - propyl - 4 - metathiazanone-1-dioxide was prepared following the procedure described in Example 44 using 20.8 g. of 2-(3,4-dichlorophenyl)-3-n-propyl-4-metathiazanone, 85 cc. of glacial acetic acid, 20 g. of potassium permanganate and 200 cc. of water. There was thus obtained 5.8 g. of the product, M.P. 85.8–91.4° C. (corr.) when recrystallized from isopropyl alcohol.

Anal.—Calcd. for $C_{13}H_{15}Cl_2NO_3S$: Cl, 21.09; S, 9.53. Found: Cl, 21.34; S, 9.83.

A dose of 200 mg. per kg. of 2-(3,4-dichlorophenyl)-3-n-propyl-4-metathiazanone-1-dioxide protected 10 out of 10, 8 out of 9, 3 out of 8 and 0 out of 8 mice for 1, 2, 4 and 6 hours, respectively, from the hind limb extensor component of maximal electroshock seizures. 2-(3,4-dichlorophenyl)-3-n-propyl-4-metathiazanone-1-dioxide was found to have an approximate acute intraperitoneal toxicity ($ALD_{50}$) in mice of 625 mg. per kg. and to have an approximate acute oral toxicity ($ALD_{50}$) in mice of 1500 mg. per kg.

Example 165

2 - (2 - methylmercaptophenyl) - 3 - ethyl - 4 - metathiazanone is obtained following the procedure described in Example 1 using 2-methylmercaptobenzaldehyde, ethylamine and beta-mercaptopropionic acid.

Example 166

2 - (4 - n - butylmercaptophenyl)-3-methyl-4-metathiazanone is obtained following the procedure described in Example 1 using 4-n-butylmercaptobenzaldehyde, methylamine and beta-mercaptopropionic acid.

Example 167

2 - (4 - ethylsulfonylphenyl)-3-ethyl-4-metathiazanone is obtained following the procedure described in Example 1 using 4-ethylsulfonylbenzaldehyde, ethylamine and beta-mercaptopropionic acid.

Example 168

2-(4-n-butylsulfonylphenyl)-3-methyl-4-metathiazanone is obtained following the procedure described in Example 1 using 4-n-butylsulfonylbenzaldehyde, methylamine and beta-mercaptopropionic acid.

Example 169

2-(4-nitrophenyl)-3-methyl - 4 - metathiazanone is obtained following the procedure described in Example 1 using 4-nitrobenzaldehyde, methylamine and beta-mercaptopropionic acid.

Example 170

2-(3-nitrophenyl)-3-ethyl-4-metathiazanone is obtained following the procedure described in Example 1 using 3-nitrobenzaldehyde, ethylamine and beta-mercaptopropionic acid.

Example 171

2-(4-aminophenyl) - 3 - methyl-4-metathiazanone is obtained by reacting the corresponding 4-nitrophenyl compound of Example 169 with a reducing agent effective to reduce nitrogroups to amino groups.

Example 172

2 - (4-n-butylaminophenyl)-3-methyl-4-metathiazanone is obtained following the procedure described in Example 1 using 4-n-butylaminobenzaldehyde, methylamine and beta-mercaptopropionic acid.

Example 173

2-(4-phenoxyphenyl)-3-methyl-4-metathiazanone is obtained following the procedure described in Example 1 using 4-phenoxybenzaldehyde, methylamine and beta-mercaptopropionic acid.

Example 174

2-(4-benzyloxyphenyl)-3-ethyl-4-metathiazanone is obtained following the procedure described in Example 1 using 4-benzyloxybenzaldehyde, ethylamine and beta-mercaptopropionic acid.

Example 175

2-(4-hydroxyphenyl)-3-ethyl-4-metathiazanone is obtained following the procedure described in Example 1 using 4-hydroxybenzaldehyde, ethylamine and beta-mercaptopropionic acid. Alternatively, this 4-hydroxyphenyl compound can be obtained by reacting the corresponding 4-benzyloxyphenyl compound of Example 174 with a reducing agent effective to remove the benzyl group.

Example 176

2-(4-n-butylsulfonylphenyl)-3-methyl - 4 - metathiazanone-1-dioxide is obtained following the procedure described in Example 44 using 2-(4-n-butylsulfonylphenyl)-3-methyl-4-metathiazanone.

Example 177

2-(4-nitrophenyl)-3-methyl-4-metathiazanone-1-dioxide is obtained following the procedure described in Example 44 using 2-(4-nitrophenyl)-3-methyl-4-metathiazanone.

Example 178

2 - (3-nitrophenyl)-3-ethyl-4-metathiazanone-1-oxide is obtained following the procedure described in Example 95 using 2-(3-nitrophenyl)-3-ethyl-4-metathiazanone.

Example 179

2-(4-aminophenyl)-3-methyl - 4 - metathiazanone-1-dioxide is obtained following the procedure described in Example 44 using 2-(4-aminophenyl)-3-methyl-4-metathiazanone.

Example 180

2 - (4-n-butylaminophenyl)-3-methyl-4-metathiazanone-1-dioxide is obtained following the procedure described in Example 44 using 2-(4-n-butylaminophenyl)-3-methyl-4-metathiazanone.

Example 181

2-(4-acetylaminophenyl)-3-methyl - 4 - metathiazanone-1-oxide is obtained following the procedure described in Example 95 using 2-(4-acetylaminophenyl)-3-methyl-4-metathiazanone.

Example 182

2-(4-phenoxyphenyl)-3-methyl - 4 - metathiazanone-1-dioxide is obtained following the procedure described in Example 44 using 2-(4-phenoxyphenyl)-3-methyl-4-metathiazanone.

Example 183

2-(4-benzyloxyphenyl) - 3 - ethyl-4-metathiazanone-1-dioxide is obtained following the procedure described in Example 44 using 2-(4-benzyloxyphenyl)-3-ethyl-4-metathiazanone.

Example 184

2-(4-hydroxyphenyl)-3-ethyl - 4 - metathiazanone-1-dioxide is obtained following the procedure described in Example 44 using 2-(4-hydroxyphenyl)-3-ethyl-4-metathiazanone.

Example 185

2 - (3,4,5-triethoxyphenyl)-3-methyl-4-metathiazanone-1-dioxide is obtained following the procedure described in Example 44 using 2-(3,4,5-triethoxyphenyl)-3-methyl-4-metathiazanone.

Example 186

2-(3,4,5-trimethoxyphenyl)-3-methyl-4-metathiazanone was prepared following the procedure described in Example 1 using 9 g. of 3,4,5-trimethoxybenzaldehyde, 3.1 g. of methylamine, 5.3 g. of beta-mercaptopropionic acid, 200 cc. of benzene and a reflux period of about eighteen hours. There was thus obtained 4.5 g. of the product, M.P. 102.0–104.4° C. (corr.) when recrystallized from isopropyl ether-isopropanol.

Analysis.—Calcd. for $C_{14}H_{19}NO_4S$: N, 4.71; S, 10.76. Found: N, 4.64; S, 10.57.

A dose of 400 mg. per kg. of 2-(3,4,5-trimethoxyphenyl)-3-methyl-4-metathiazanone protected 3 out of 10 mice for one hour from the hind limb extensor component of maximal electroshock seizures.

Example 187

2-(3-trifluoromethylphenyl)-3-methyl-4-metathiazanone is obtained following the procedure described in Example 1 using 3-trifluoromethylbenzaldehyde, methylamine and beta-mercaptopropionic acid.

Example 188

2-(3-trifluoromethylphenyl)-3-methyl - 4 - metathiazanone-1-dioxide is obtained following the procedure described in Example 44 using 2-(3-trifluoromethylphenyl)-3-methyl-4-metathiazanone.

Example 189

2-(4-phenylmercaptophenyl)-3-methyl - 4 - metathiazanone is obtained following the procedure described in Example 1 using 4-phenylmercaptobenzaldehyde, methylamine and beta-mercaptopropionic acid.

Example 190

2-(4-benzylphenyl)-3-ethyl - 4 - metathiazanone is obtained following the procedure described in Example 1 using 4-benzylbenzaldehyde, ethylamine and beta-mercaptopropionic acid.

Example 191

2-[4-(4-chlorophenoxy)phenyl] - 3 - methyl - 4-metathiazanone is obtained following the procedure described in Example 1 using 4-(4-chlorophenoxy)benzaldehyde, methylamine and beta-mercaptopropionic acid.

Example 192

2-(2-ethoxy-1-naphthyl) - 3-methyl-4-metathiazanone is obtained following the procedure described in Example 1 using 2-ethoxy-1-naphthaldehyde, methylamine and beta-mercaptopropionic acid.

Example 193

2 - [4 - (4 - chlorophenyl)phenyl] - 3 - ethyl-4-metathiazanone is obtained following the procedure described in Example 1 using 4-(4-chlorophenyl)benzaldehyde, ethylamine and beta-mercaptopropionic acid.

Example 194

2-(5-nitro-2-furyl)-3-ethyl-4-metathiazanone is obtained following the procedure described in Example 1 using 5-nitro-2-furaldehyde, ethylamine and beta-mercaptopropionic acid.

Example 195

2-(5 - chloro - 3 - pyridyl)-3-methyl-4-metathiazanone is obtained following the procedure described in Example 1 using 5-chloro-3-pyridinecarboxaldehyde, methylamine and beta-mercaptopropionic acid.

Example 196

2-(3,4,5 - tribromo - 2 - thienyl) - 3 - ethyl-4-metathiazanone is obtained following the procedure described in Example 1 using 3,4,5-tribromo-2-thiophenealdehyde, ethylamine and beta-mercaptopropionic acid.

Example 197

2-(2 - ethoxy - 1 - naphthyl) - 3 - methyl - 4 - metathiazanone-1-oxide is obtained following the procedure described in Example 95 using 2-(2-ethoxy-1-naphthyl)-3-methyl-4-metathiazanone.

Example 198

2-[4-(4 - chlorophenyl)phenyl] - 3 - methyl - 4 - metathiazanone-1-oxide is obtained following the procedure described in Example 95 using 2-[4-(4-chlorophenyl)phenyl]-3-methyl-4-metathiazanone.

Example 199

2-(5 - nitro - 2 - furyl) - 3 - ethyl - 4 - metathiazanone-1-dioxide is obtained following the procedure described in Example 44 using 2-(5-nitro-2-furyl)-3-ethyl-4-metathiazanone.

Example 200

2-(5-chloro - 3 - pyridyl) - 3-methyl-4-metathiazanone-1-dioxide is obtained following the procedure described in Example 44 using 2-(5-chloro-3-pyridyl)-3-methyl-4-metathiazanone.

Example 201

2-(3,4,5 - tribromo - 2 - thienyl) - 3 - ethyl-4-metathiazanone-1-dioxide is obtained following the procedure described in Example 44 using 2-(3,4,5-tribromo-2-thienyl)-3-ethyl-4-metathiazanone.

Example 202

2-(4 - chlorophenyl) - 3 - (4 - chlorobenzyl) - 4 - metathiazanone is obtained following the procedure described in Example 1 using 4-chlorobenzaldehyde, 4-chlorobenzylamine and beta-mercaptopropionic acid.

Example 203

2-(4 - chlorophenyl) - 3 - [2-(3,4 - dimethoxyphenyl) ethyl]-4-metathiazanone is obtained following the procedure described in Example 1 using 4-chlorobenzaldehyde, 2-(3,4-dimethoxyphenyl)ethylamine and beta-mercaptopropionic acid.

Example 204

2-(3,4 - dichlorophenyl) - 3 - (4-acetylaminobenzyl)-4-metathiazanone is obtained following the procedure described in Example 1 using 3,4-dichlorobenzaldehyde, 4-acetylaminobenzylamine and beta-mercaptopropionic acid.

Example 205

2-(4 - chlorophenyl) - 3 - (2 - furylmethyl)-4-metathiazanone is obtained following the procedure described in Example 1 using 4-chlorobenzaldehyde, 2-furylmethylamine and beta-mercaptopropionic acid.

Example 206

2-(3,4-dichlorophenyl) - 3 - [2 - (2 - pyridyl)ethyl]-4-metathiazanone is obtained following the procedure described in Example 1 using 3,4-dichlorobenzaldehyde, 2-(2-pyridyl)ethylamine and beta-mercaptopropionic acid.

Example 207

2-(4 - chlorophenyl) - 3 - (2-thienylmethyl)-4-metathiazanone is obtained following the procedure described in Example 1 using 4-chlorobenzaldehyde, 2-thienylmethylamine and beta-mercaptopropionic acid.

Example 208

2-(4-chlorophenyl)-3-propargyl - 4 - metathiazanone is obtained following the procedure described in Example 1 using 4-chlorobenzaldehyde, propargylamine and beta-mercaptopropionic acid.

Example 209

2-(4 - chlorophenyl) - 3 - propargyl-4-metathiazanone-1-dioxide is obtained following the procedure described in Example 44 using 2-(4-chlorophenyl)-3-propargyl-4-metathiazanone.

Pharmacological evaluation of the compounds of the invention has demonstrated that they possess a variety of depressant actions on the central nervous system. They lower the rectal temperature in mice; they potentiate the sleeping time in mice induced by hexobarbital sodium; they reduce or abolish the crossed extensor reflex in the acute spinal cat without effecting the monosynaptic knee jerk reflex; and they protect mice from the hind limb extensor component of maximal electroshock seizures. These results indicate their usefulness as central nervous system depressants, in particular, as internuncial blocking agents, anticonvulsants, antipyretics, and barbiturate-potentiating agents. The compounds can be prepared for oral administration in solid form with the aid of a carrier. Thus, the compounds can be formulated in unit dosage form as tablets in combination with a suitable adjuvant such as one or more of the following: calcium carbonate, starch, gelatin, talc, magnesium stearate, acacia, and the like; or, alternatively, they can be employed in capsule form either alone or admixed with an adjuvant. Alternatively, the compounds can be formulated for oral administration as an aqueous suspension, aqueous-alcohol solutions, oil solutions, or oil-water emulsions, in the same manner in which conventional medicinal substances are formulated.

I claim:

1. Compound of the formula

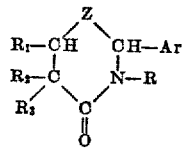

where Z is a member of the group consisting of S, SO and $SO_2$, Ar is aromatic having from one to two aromatic rings each having from five to six ring-atoms, R is a member of the group consisting of hydrogen, alkyl having from one to eight carbon atoms, alkenyl having from three to eight carbon atoms, alkynyl having from three to eight carbon atoms, cycloalkyl having from three to six ring-carbon atoms, cycloalkylalkyl having from three to six ring-carbon atoms and having up to a total of eight carbon atoms, and (monocyclic-aromatic)-alkyl where monocyclic-aromatic has from five to six ring-atoms and alkyl has from one to two carbon atoms, and $R_1$, $R_2$ and $R_3$ are members of the group consisting of hydrogen and lower-alkyl.

2. 2-Ar-3-alkyl-4-metathiazanone of the formula

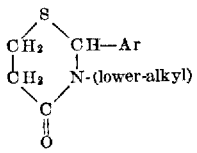

where Ar is monocarbocyclic aryl having six ring-carbon atoms.

3. 2-Ar-3-alkyl-4-metathiazanone-1-oxide of the formula

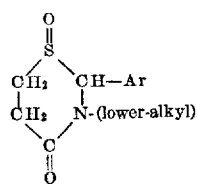

where Ar is monocarbocyclic aryl having six ring-carbon atoms.

4. 2-Ar-3-alkyl-4-metathiazanone-1-dioxide having the formula

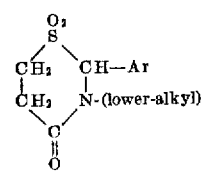

where Ar is monocarbocyclic aryl having six ring-carbon atoms.

5. 2 - (dihalophenyl) - 3 - (lower-alkyl) - 4 - metathiazanone.

6. 2-(halophenyl)-3-lower-alkyl)-4-metathiazanone.

7. 8 - (dihalophenyl) - 3 - (lower - alkyl) - 4 - metathiazanone-1-oxide.

8. 2 - (halophenyl) - 3 - (lower - alkyl) - 4 - metathiazanone-1-oxide.

9. 2 - (dihalophenyl) - 3 - (lower - alkyl) - 4 - metathiazanone-1-dioxide.

10. 2 - (halophenyl) - 3 -(lower - alkyl) - 4 - metathiazanone-1-dioxide.

11. 2-(3,4-dichlorophenyl)-3-ethyl-4-metathiazanone.

12. 2-(4-chlorophenyl)-3-methyl-4-metathiazanone.

13. 2 - (3,4 - dichlorophenyl) - 3 - methyl - 4 - metathiazanone-1-oxide.

14. 2 - (3,4 - dichlorophenyl) - 3 - ethyl - 4 - metathiazanone-1-oxide.

15. 2 - (4 - chlorophenyl) - 3 - ethyl - 4 - metathiazanone-1-oxide.

16. 2 - (3,4 - dichlorophenyl) - 3 -methyl - 4 - metathiazanone-1-dioxide.

17. 2 - (4 - chlorophenyl) - 4 - methyl - 4 - metathiazanone-1-dioxide.

18. 2 - (4 -chlorophenyl) - 3 - ethyl - 4 - metathiazanone-1-dioxide.

19. A process for the preparation of 2-Ar-4-metathiazanone having the formula

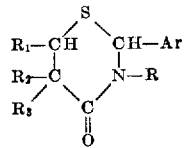

where Ar is aromatic having from one to two aromatic rings each having from five to six ring-atoms, R is a member of the group consisting of hydrogen, alkyl having from one to eight carbon atoms, alkenyl having from three to eight carbon atoms, alkynyl having from three to eight carbon atoms, cycloalkyl having from three to six ring-carbon atoms, cycloalkylalkyl having from three to six ring-carbon atoms and having up to a total of eight carbon atoms, and (monocyclic-aromatic)-alkyl where monocyclic-aromatic has from five to six ring-atoms and alkyl has from one to two carbon atoms, and $R_1$, $R_2$ and $R_3$ are members of the group consisting of hydrogen and lower-alkyl, which comprises heating a mixture of an aromatic-aldehyde of the formula Ar—CHO, a beta-mercaptopropionic acid of the formula $$HS—CH(R_2)C(R_2)(R_3)COOH$$

and a member of the group consisting of an aminating agent and a primary amine of the formula R—$NH_2$ where R is other than H as defined above.

20. A process for the preparation of 2-Ar-3-(lower-alkyl)-4-metathiazanone of the formula

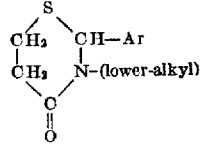

where Ar is monocarbocyclic aryl having six ring-carbon atoms, which comprises heating a mixture of an arylaldehyde of the formual Ar—CHO, beta-mercaptopropionic acid and lower-alkylamine.

21. A process for the preparation of 2-(dihalophenyl)-3-(lower-alkyl)-4-metathiazanone which comprises heating a mixture of dihalobenzaldehyde, beta-mercaptopropionic acid and lower-alkylamine.

22. A process for the preparation of 2-(halophenyl)-3-(lower-alkyl)-4-metathiazanone which comprises heating a mixture of halobenzaldehyde, beta-mercaptopropionic acid and lower-alkylamine.

23. A process for the prepartion of 2-Ar-4-metathiazanone-1-oxide having the formula

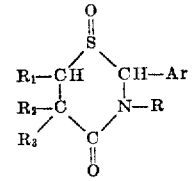

where Ar is aromatic having from one to two aromatic rings each having from five to six ring-atoms, R is a member of the group consisting of hydrogen, alkyl having from one to eight carbon atoms, alkenyl having from three to eight carbon atoms, alkynyl having from three to eight carbon atoms, cycloalkyl having from three to six ring-carbon atoms, cycloalkylalkyl having from three to six ring-carbon atoms and having up to a total of eight carbon atoms, and (monocyclic-aromatic)-alkyl where monocyclic-aromatic has from five to six ring-atoms and alkyl has from one to two carbon atoms, and $R_1$, $R_2$ and $R_3$ are members of the group consisting of hydrogen and lower-alkyl, which comprises oxidizing the corresponding 2-Ar-4-metathiazanone with an oxidizing agent effective to oxidize sulfides to sulfoxides.

24. A process for the preparation of 2-Ar-4-(lower-alkyl-4-metathiazanone-1-oxide of the formula

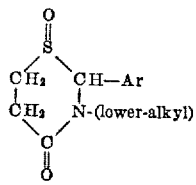

where Ar is monocarbocyclic aryl having six ring-carbon atoms, which comprises oxidizing the corresponding 2-Ar-3-(lower-alkyl)-4-metathiazanone with an oxidizing agent effective to oxidize sulfides to sulfoxides.

25. A process for the preparation of 2-(dihalophenyl)-3-(lower-alkyl)-4-metathiazanone-1-oxide which comprises oxidizing the corresponding 2-(dihalophenyl)-3-(lower-alkyl)-4-metathiazanone with an oxidizing agent effective to oxidize sulfides to sulfoxides.

26. A process for the preparation of 2-(halophenyl)-3-(lower-alkyl)-4-metathiazanone-1-oxide which comprises oxidizing the corresponding 2-(halophenyl)-3-(lower-alkyl)-4-metathiazanone with an oxidizing agent effective to oxidize sulfides to sulfoxides.

27. A process for the preparation of 2-Ar-4-metathiazanone-1-dioxide of the formula

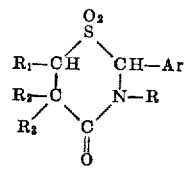

where Ar is aromatic having from one to two aromatic rings each having from five to six ring-atoms, R is a member of the group consisting of hydrogen, alkyl having from one to eight carbon atoms, alkenyl having from three to eight carbon atoms, alkynyl having from three to eight carbon atoms, cycloalkyl having from three to six ring-carbon atoms, cycloalkylalkyl having from three to six ring-carbon atoms and having up to a total of eight carbon atoms, and (monocyclic-aromatic)-alkyl where monocyclic-aromatic has from five to six ring-atoms and alkyl has from one to two carbon atoms, and $R_1$, $R_2$ and $R_3$ are members of the group consisting of hydrogen and lower-alkyl, which comprises oxidizing the corresponding 2-Ar-4-metathiazanone with an oxidizing agent effective to oxidize sulfides to sulfones.

28. A process for the preparation of 2-Ar-3-alkyl-4-metathiazanone-1-dioxide of the formula

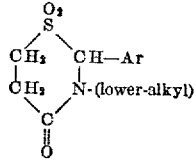

where Ar is monocarbocyclic aryl having six ring-carbon atoms, which comprises oxidizing the corresponding 2-Ar-3-(lower-alkyl)-4-metathiazanone with an oxidizing agent effective to oxidize sulfides to sulfones.

29. A process for the preparation of 2-(dihalophenyl)-3-(lower-alkyl)-4-metathiazanone-1-dioxide which comprises oxidizing the corresponding 2-(dihalophenyl)-3-(lower-alkyl)-4-metathiazanone with an oxidizing agent effective to oxidize sulfides to sulfones.

30. A process for the preparation of 2-(halophenyl)-3-(lower-alkyl)-4-metathiazanone-1-dioxide which comprises oxidizing the corresponding 2-(halophenyl)-3-(lower-alkyl)-4-metathiazanone with an oxidizing agent effective to oxidize sulfides to sulfones.

References Cited in the file of this patent

UNITED STATES PATENTS

| | | |
|---|---|---|
| 2,585,064 | Wheeler | Feb. 12, 1952 |
| 2,679,500 | Gash | May 25, 1954 |
| 2,755,278 | Goldberg | July 17, 1956 |
| 2,786,838 | Skinner | Mar. 26, 1957 |

FOREIGN PATENTS

| | | |
|---|---|---|
| 769,261 | Great Britain | Mar. 6, 1957 |

OTHER REFERENCES

Mushkalo et al.: Chem. Abst., vol. 50, page 16751 (1956).

UNITED STATES PATENT OFFICE
CERTIFICATE OF CORRECTION

Patent No. 3,082,209　　　　　　　　　　　　　　March 19, 1963

Alexander R. Surrey

It is hereby certified that error appears in the above numbered patent requiring correction and that the said Letters Patent should read as corrected below.

Column 1, line 57, for "pyrrryl" read -- pyrryl --; column 2, line 39, for "radical" read -- radicals --; column 4, lines 28 and 29, for "0 C. to 10° C." read -- 0° C. to 10° C. --; line 52, for "and-1-di-" read -- and -1-di- --; line 53, strike out "metathiazanones and corresponding -1-oxides and -1-di-"; column 8, line 31, for "ni" read -- in --; line 53, for "beat-" read -- beta- --; column 9, line 21, for "15 g. methyl-" read -- 15 g. of methyl- --; line 74, for "adminisrtation" read -- administration --; column 14, line 72, for "S, 13.90" read S, 10.90 --; column 15, line 4, for "69" read -- 60 --; line 51, for "metathiazonone" read -- metathiazanone --; column 18, line 73, for "(i.p. DP$_{50}$)" read -- (i.p. PD$_{50}$) --; column 19, line 32, for "metathiazonone" read -- metathiazanone --; line 45, for "dose of" read -- dose level of --; column 20, line 48, for "6.2 g of" read -- 6.2 g. of --; column 21, line 38, for "metathrazonone" read -- metathiazanone --; line 40, for "1% tragacanth" read -- 1% gum tragacanth --; column 25, line 50, for C, 23.24" read -- Cl, 23.24 --; column 30, line 75, for "(4-fluorophenyl)4-" read -- (4-fluorophenyl)-4- --; column 31, line 34, for "2-(ethoxy-" read -- 2-(3-ethoxy- --; column 35, line 29, for "nitrogroups" read -- nitro groups --; column 39, line 53, for "2-(halophenyl)-3-lower" read -- 2-(halophenyl)-3-(lower --; line 54, for "8-(dihalophenyl)" read -- 2-(dihalophenyl) --; line 72, for "4-methyl" read -- 3-methyl --; column 40, line 25, for that portion of the formula reading, "HS—CH(R$_2$)" read -- HS—CH(R$_1$) --; line 41, for "formual" read -- formula --; column 41, lines 1 and 2, for "4-(lower-alkyl—4" read -- 4-(lower-alkyl)-4 --.

Signed and sealed this 3rd day of December 1963.

(SEAL)
Attest:
ERNEST W. SWIDER

ATTESTING OFFICER

EDWIN L. REYNOLDS
Acting Commissioner of Patents